(12) United States Patent
Noh

(10) Patent No.: US 9,544,111 B2
(45) Date of Patent: Jan. 10, 2017

(54) METHOD AND DEVICE FOR RANDOM ACCESS POWER CONTROL

(71) Applicant: KT CORPORATION, Gyeonggi-do (KR)

(72) Inventor: Minseok Noh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/419,270

(22) PCT Filed: Jul. 26, 2013

(86) PCT No.: PCT/KR2013/006740
§ 371 (c)(1),
(2) Date: Feb. 3, 2015

(87) PCT Pub. No.: WO2014/021589
PCT Pub. Date: Feb. 6, 2014

(65) Prior Publication Data
US 2015/0223181 A1  Aug. 6, 2015

(30) Foreign Application Priority Data

Aug. 3, 2012 (KR) ........................ 10-2012-0085417
Jun. 14, 2013 (KR) ........................ 10-2013-0068121

(51) Int. Cl.
*H04L 5/00* (2006.01)
*H04W 52/50* (2009.01)
(Continued)

(52) U.S. Cl.
CPC ......... *H04L 5/0048* (2013.01); *H04L 25/0226* (2013.01); *H04W 52/50* (2013.01); *H04W 52/242* (2013.01); *H04W 74/0833* (2013.01)

(58) Field of Classification Search
None
See application file for complete search history.

(56) References Cited

U.S. PATENT DOCUMENTS 8,879,414 B2 * 11/2014 Chun ................... H04B 7/0626
                                                    370/252
8,918,135 B2 * 12/2014 Park ..................... H04W 52/146
                                                    370/252
(Continued)

FOREIGN PATENT DOCUMENTS

| KR | 10-2002-0026436 A | 4/2002 |
| KR | 10-2010-0077867 A | 7/2010 |
| KR | 10-2010-0131429 A | 12/2010 |

OTHER PUBLICATIONS

Qualcomm Incorporated, "Uplink power control issues in CoMP", 3GPP TSG-RAN WG1 #68, R1-120556, Feb. 6-10, 2012, Dresden, Germany.

(Continued)

*Primary Examiner* — Hong Cho
(74) *Attorney, Agent, or Firm* — IP Legal Services, LLC

(57) ABSTRACT

The present disclosure relates to a method and a device for random access power control. Such a method for random access power control present disclosure may include setting, by a first base station, random access preamble transmission power required for a random access of a terminal with a second base station and transmitting by the first base station, to the terminal, a downlink signal including information on the set transmission power and information indicating the random access of the second base station.

12 Claims, 15 Drawing Sheets

(51) Int. Cl.
*H04L 25/02* (2006.01)
*H04W 74/08* (2009.01)
*H04W 52/24* (2009.01)

(56) References Cited

U.S. PATENT DOCUMENTS

| | | | | |
|---|---|---|---|---|
| 9,042,925 | B2* | 5/2015 | Seo | H04W 56/00 455/408 |
| 2001/0026547 | A1 | 10/2001 | Moulsley et al. | |
| 2010/0255847 | A1* | 10/2010 | Lee | H04W 74/004 455/436 |
| 2010/0265900 | A1 | 10/2010 | Baldemair et al. | |
| 2010/0311452 | A1* | 12/2010 | Li | H04W 72/08 455/509 |
| 2011/0003560 | A1* | 1/2011 | Futaki | H04W 52/24 455/67.16 |
| 2011/0188427 | A1* | 8/2011 | Ishii | H04W 52/367 370/311 |
| 2012/0178482 | A1* | 7/2012 | Seo | H04W 56/00 455/501 |
| 2012/0214538 | A1* | 8/2012 | Kim | H04W 52/50 455/522 |
| 2012/0302278 | A1 | 11/2012 | Baldemair et al. | |
| 2013/0121301 | A1* | 5/2013 | Kim | H04W 24/10 370/329 |

OTHER PUBLICATIONS

Research in Motion, UK Limited, "PRACH Enhancement and UL Power Control for CoMP Scenario 4", 3GPP TSG RAN WG1 Meeting #66, R1-112372, Athens, Greece, Aug. 22-26, 2011.
Huawei, Hisilicon, "Power control design for UL CoMP scenario 3 and 4", 3GPP TSG RAN WG1 Meeting #66b, R1-112908, Zhuhai, China, Oct. 10-14, 2011.

* cited by examiner

METHOD AND DEVICE FOR RANDOM ACCESS POWER CONTROL

CROSS REFERENCE TO RELATED APPLICATIONS

This application is a National Stage Patent Application of PCT International Patent Application No. PCT/KR2013/006740 (filed on Jul. 26, 2013) under 35 U.S.C. §371, which claims priority to Korean Patent Application Nos. 10-2012-0085417 (filed on Aug. 3, 2012) and 10-2013-0068121 (filed on Jun. 14, 2013), the teachings of which are incorporated herein in their entireties by reference.

TECHNICAL FIELD

The present disclosure relates to a method and apparatus for random access power control, and more particularly, to a technology that controls transmission power for transmission of a random access preamble when a plurality of cells or a plurality of transmission/reception points coexists.

BACKGROUND ART

Advances in communication systems enable consumers (e.g., companies and individuals) to use various types of wireless terminals. Current mobile communication systems have employed 3GPP technologies, for example, Long Term Evolution (LTE), LTE-Advanced (LTE-A), and the like. Such mobile communication systems may be high capacity communication systems capable of transmitting and receiving various data, such as image data, wireless data, and the like, beyond providing a sound-based service. In order for high capacity communication, there is a desire for developing a technology that transmits high capacity data. Data may be efficiently transmitted through a plurality of cells as a scheme for transmitting high capacity data. In data transmissions using a plurality of cells or transmission/reception points, signals may collide with one another, which is a drawback. That is, a typical scheme may not be used for power control when a communication environment includes a plurality of cells.

DETAILED DESCRIPTION OF THE INVENTION

Technical Problem

Technical Field

To solve the above described drawback, a method may be provided for setting transmission power required for an uplink random access and indicating new random access for a User Equipment (UE), so that the UE checks the indication and controls random access.

Technical Solution

In accordance with an aspect of the present disclosure, a method of executing random access power control is provided, the method including: setting, by a first base station, a random access preamble transmission power required for random access between a second base station and a User Equipment (UE); and transmitting, by the first base station to the UE, a downlink signal including information associated with the set transmission power and information indicating the random access to the second base station.

In accordance with another aspect of the present disclosure, a method of executing random access power control is provided, the method including: setting a random access transmission power by determining information indicating random access to a second base station and information associated with a set random access preamble transmission power required for the random access to the second base station, from a downlink that the UE receives from a first base station; and transmitting a random access preamble to the second base station.

In accordance with another aspect of the present disclosure, a base station that executes random access power control is provided, the base station including: a receiver configured to receive a signal from a User Equipment (UE); a controller configured to set a random access preamble transmission power required for random access between a second base station and the UE, and generates a downlink that includes information associated with the set transmission power and information indicating random access to the second base station; and a transmitter configured to transmit the downlink to the UE.

In accordance with another aspect of the present disclosure, a UE that executes random access power control is provided, the UE including: a receiver configured to receive a signal from a first base station; a controller configured to set a random access transmission power by determining information indicating random access to a second base station and information associated with a set random access preamble transmission power required for the random access to the second base station, from a downlink that the UE receives from the first base station; and a transmitter configured to transmit a random access preamble to the second base station.

Advantageous Effects

The a transmission power required for uplink random access may be set, new random access for a User Equipment (UE) may be indicated, and random access transmission power may be controlled in an environment including a plurality of cells or transmission/reception points.

MODE FOR CARRYING OUT THE INVENTION

Figure 1:
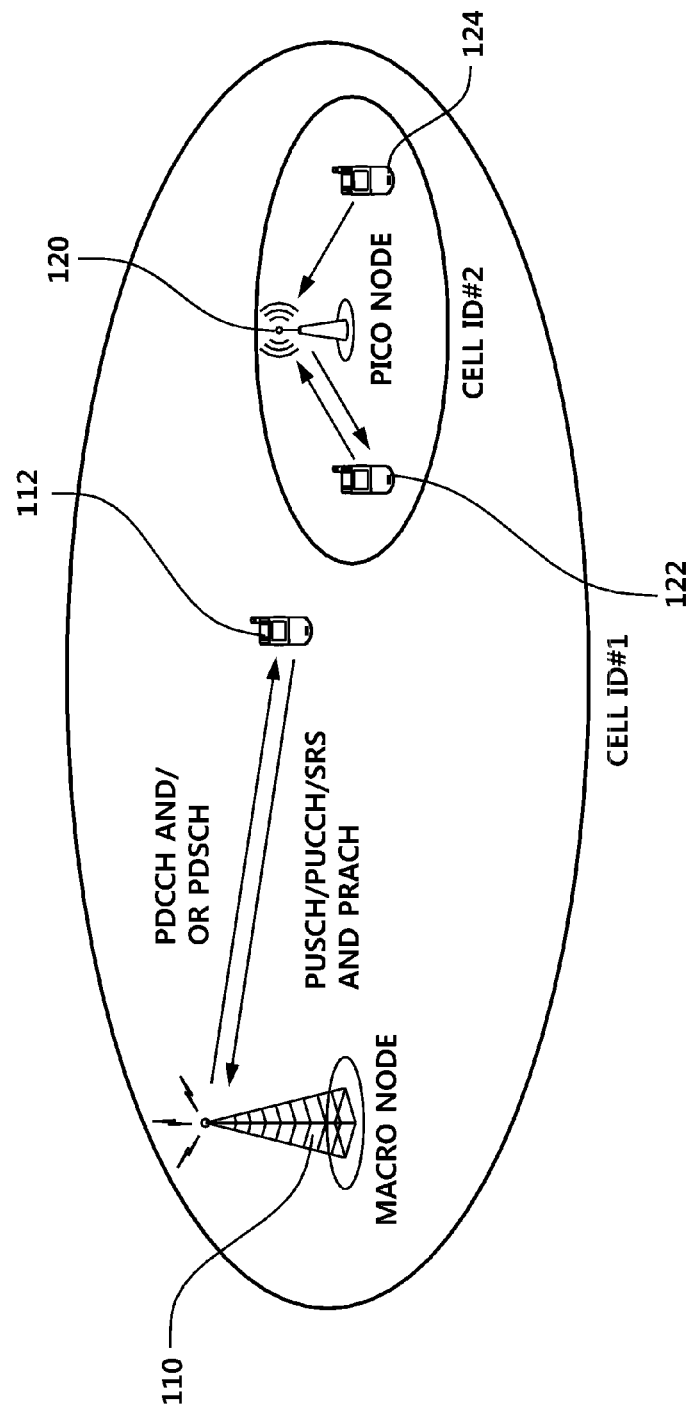
FIG. 1 illustrates an uplink/downlink data transmission method in accordance with an embodiment of the present disclosure.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein may be omitted when it may make the subject matter of the present disclosure rather unclear.

A wireless communication system may be widely used so as to provide various communication services, such as a voice service, packet data, and the like. Such a wireless communication system may include a User Equipment (UE) and a Base Station (BS or an eNB). Throughout the specifications, the user equipment may be an inclusive concept indicating a terminal utilized in wireless communication, including a User Equipment (UE) in wideband code division multiple access (WCDMA), long term evolution (LTE), high speed packet access (HSPA), and the like, and an Mobile station (MS), a user terminal (UT), an subscriber station (SS), a wireless device, and the like in global system for mobile (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a Base Station Controller (BSC) in code division multiple access (CDMA), a NodeB in WCDMA, an eNB or a sector (site) in LTE, and the like, and this concept may include various coverage areas, such as a megacell, a macrocell, a microcell, a picocell, a femtocell, a communication range of a relay node, an RRU, and an RU, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), Physical Control Format Indicator Channel (PCFICH), Physical Hybrid ARQ Indicator Channel (PHICH), Physical Uplink Control Channel (PUCCH), and the like, and may be configured as a data channel, such as Physical Downlink Shared Channel (PDSCH), Physical Uplink Shared Channel (PUSCH), and the like, so as to transmit data.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Control information may be transmitted using an EPDCCH (enhanced PDCCH or extended PDCCH).

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In this instance, a first UE (UE1) transmits an uplink signal to an eNB, and a second UE transmits an uplink signal to an RRH, as in the description provided hereinafter with reference to the drawings.

FIG. 1 illustrates an uplink/downlink data transmission method in accordance with an embodiment of present disclosure.

A User Equipment (UE) 112 transmits and receives an uplink/downlink control channel and data channel, a Sounding Reference Signal (SRS), and a Physical Random Access Channel (PRACH) to/from a macro node 110, and other UEs 122 and 124 transmit and receive a data channel and a control channel to/from a pico node 120. The macro node 110 and the pico node 120 have different cell IDs. Particularly, the UE 112 receives a PDCCH and/or a PDSCH from the macro node 110, and receives a PUSCH/PUCCH/SRS and a PRACH from the macro node 110.

Figure 2:
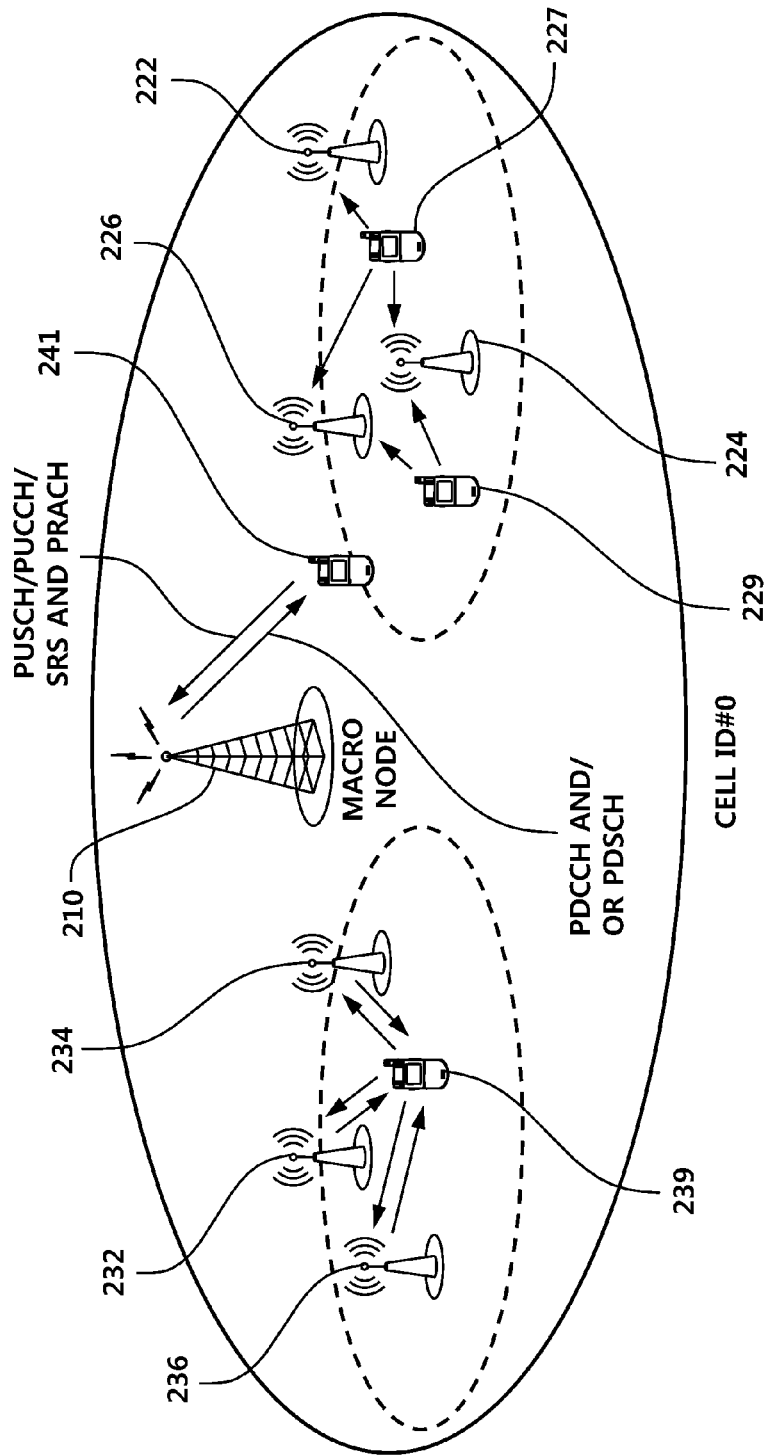
FIG. 2 illustrates an uplink/downlink data transmission method in accordance with another embodiment of the present disclosure.

FIG. 2 illustrates an uplink/downlink data transmission method in accordance with another embodiment of present disclosure.

A UE 241 is located at an edge of a service area of three nodes 222, 224, and 226. The UE 241 transmits an uplink control channel and a data channel to a macro node 210 and receives a downlink control channel and/or data channel from the macro node 210. In FIG. 2, the macro node 210 and six nodes 222, 224, 226, 232, 234, and 236 uses a single cell ID.

Hereinafter, a cell, a Remote Radio Head (RRH), an antenna, a Radio Unit (RU), a Low Power Node (LPN), and a point are referred to as a base station. A base station where a corresponding UE belongs, for example, a base station that executes the function of a macro base station (a macro node), is referred to as a transmission/reception base station.

Transmission to the transmission/reception base station and transmission to a base station that is different from the transmission/reception base station may use a physical cell identifier and a virtual cell identifier. For example, a physical cell identifier may be used as a cell identifier of the transmission/reception base station for transmission of an uplink related channel with respect to a downlink control channel and/or a data channel transmitted by a transmission/reception base station, when generating a sequence for identification when the uplink related channel is generated as a signal for transmission by the transmission/reception base station. Conversely, the virtual cell identifier may be received and used for transmission to a base station that is different from the transmission/reception base station. In accordance with an embodiment, the virtual cell identifier may be provided from a higher layer.

Figure 3:
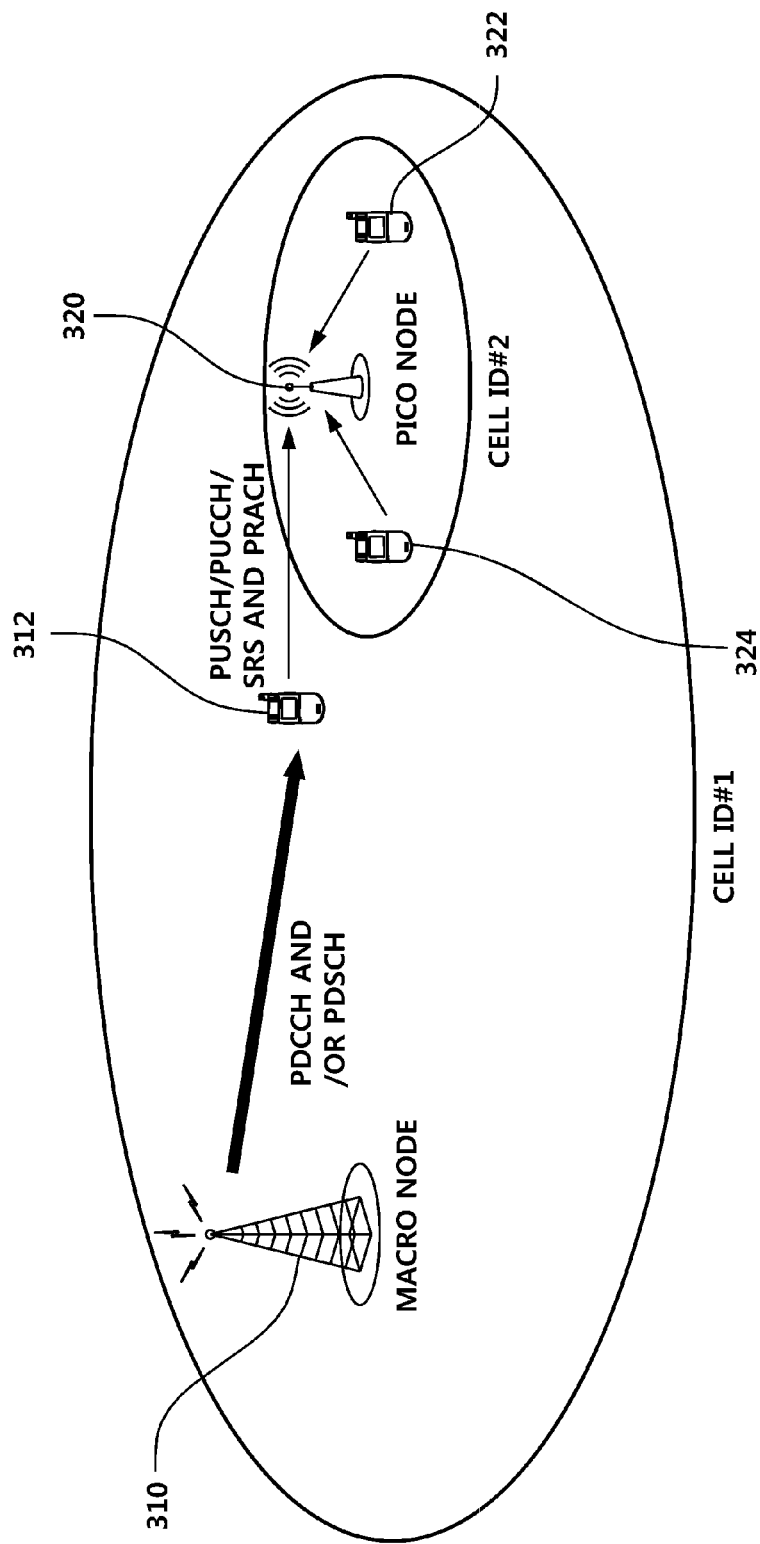
FIG. 3 is a diagram illustrating transmitting all uplink related channels to a base station having good geometry and channel quality for a User Equipment (UE), according to an embodiment of the present disclosure.

FIG. 3 is a diagram illustrating transmitting uplink related channels from a user equipment to a base station having good geometry and channel quality in accordance with an embodiment of the present disclosure.

Referring to FIG. 3, a UE receives a downlink control channel and a data channel from a cell/base station/RRH/antenna/RU/LPN/point where the UE belongs, and a UE transmits uplink related channels to a cell/base station/RRH/antenna/RU/LPN/point having good geometry and channel quality.

A UE 312 may receive a PDCCH which is a downlink control channel and/or a PDSCH which is a data channel, from a macro node 310, which is an example of a transmission/reception base station. However, the UE 312 transmits uplink related channels (PUSCH/PUCCH/SRS, PRACH) to a base station that is adjacent to the UE 312 or a base station having good channel quality, for example, a pico node 320. The cell ID of the transmission/reception base station 310 is #1 and the cell ID of the pico node 320 is #2. In FIG. 3, the pico node 320 is a base station having good geometry or channel quality for the UE 312.

Figure 4:
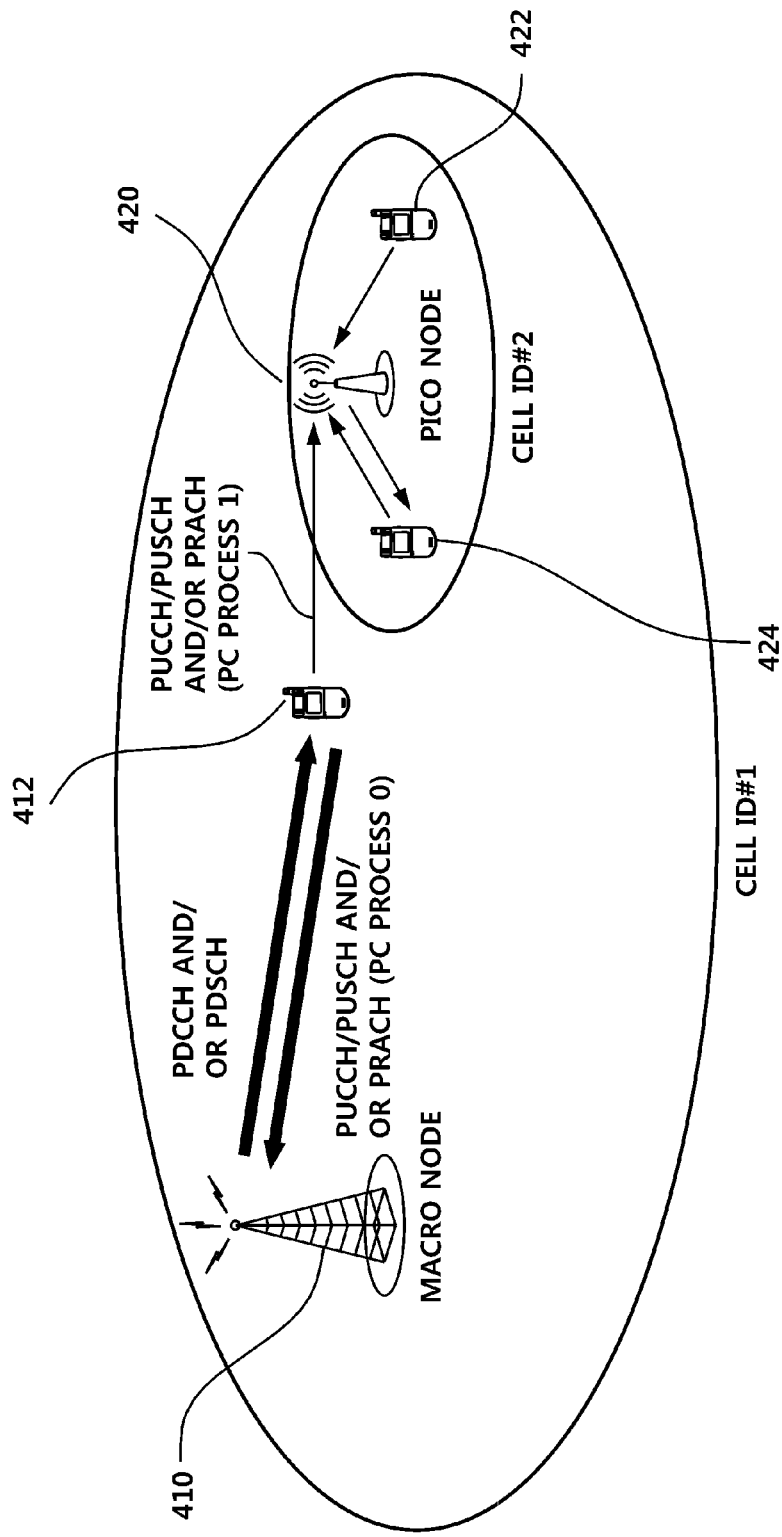
FIG. 4 is a diagram illustrating transmitting by a UE a random access preamble to a transmission/reception base station where the UE belongs and to a base station where the UE does not belong, based on an independent process, according to another embodiment of the present disclosure.

FIG. 4 is a diagram illustrating transmitting a random access preamble from a UE to a transmission/reception base station where the UE belongs and to a base station where the UE does not belong, based on an independent process, in accordance with another embodiment of the present disclosure.

Referring to FIG. 4, a UE receives a downlink control channel and a data channel from a cell/base station/RRH/antenna/RU/LPN/point where the UE belongs. The UE transmits a PUCCH and a PUSCH to a corresponding cell/base station/RRH/antenna/RU/LPN/point or another cell/base station/RRH/antenna/RU/LPN/point. The PUCCH that transmits A/N with respect to a downlink transmission and the PUSCH is an uplink data channel from among uplink related channels. The UE transmits a random access preamble to a cell/base station/RRH/antenna/RU/LPN/point where the UE belongs and another cell/base station/RRH/antenna/RU/LPN/point where the UE does not belong, based on an independent Power Control (PC) process.

A UE 412 may receive a PDCCH which is a downlink control channel and/or a PDSCH which is a data channel, from a transmission/reception base station, for example, a macro node 410. In addition, in an uplink, the UE 412 transmits a PUCCH and a PUSCH to the macro node 410 or a pico node 420. The UE 412 applies an independent configuration when transmitting a PRACH. For example, the UE transmits a PRACH having a PC process 0 to the corresponding transmission/reception base station 410, and transmits a PRACH having a PC process 1 to the pico node 420. The cell ID of the macro node 410, which is a transmission/reception base station, is #1, and the cell ID of the pico node 420 is #2.

Figure 5:
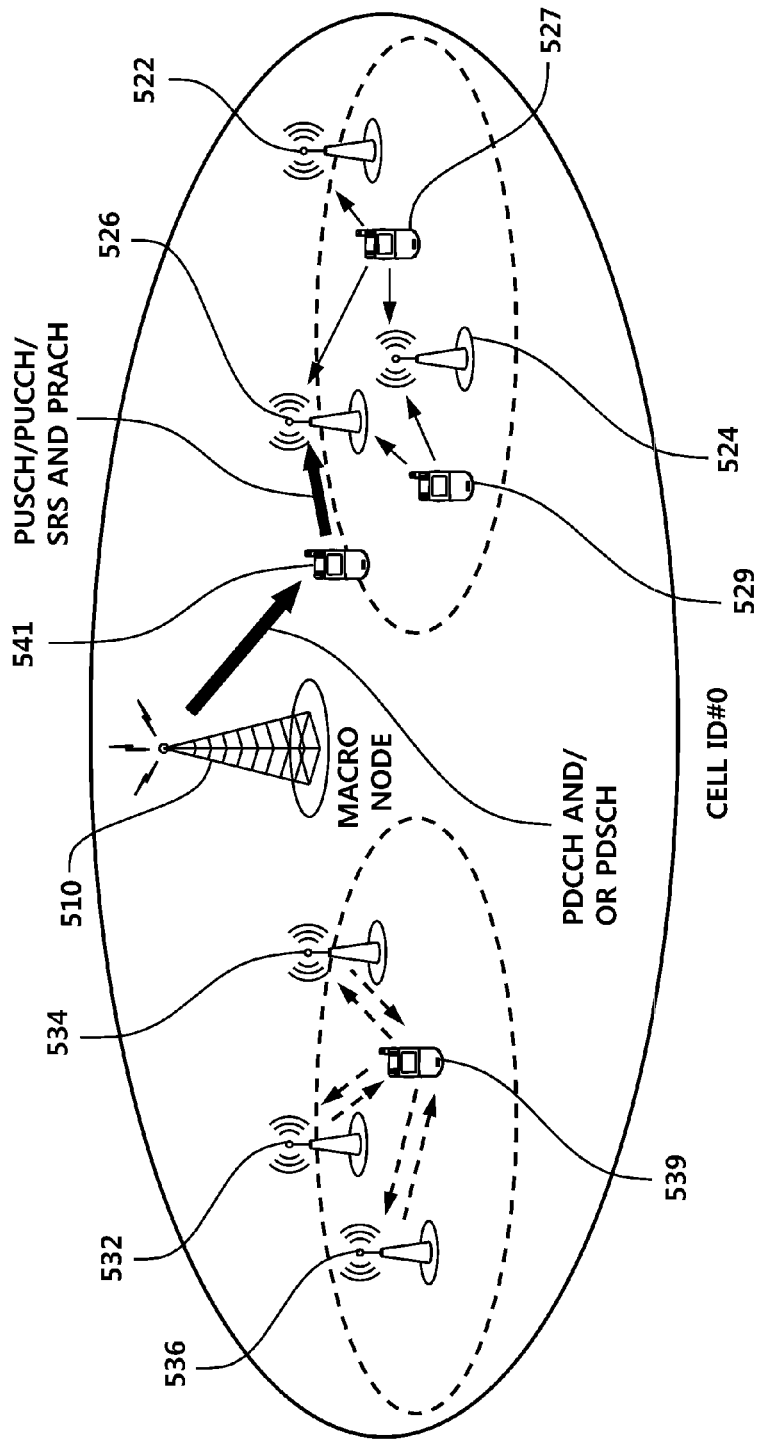
FIG. 5 is a diagram illustrating transmitting all uplink related channels to a base station having good geometry and channel quality for a UE, according to another embodiment of the present disclosure.

FIG. 5 is a diagram illustrating transmitting uplink related channels to a base station having good geometry and channel quality for a UE in accordance with another embodiment of the present disclosure.

Referring to FIG. 5, a UE receives a downlink control channel and a data channel from a cell/base station/RRH/antenna/RU/LPN/point where a corresponding UE belongs. A UE transmits uplink related channels to a cell/base station/RRH/antenna/RU/LPN/point having good geometry and channel quality for a corresponding UE.

A UE 541 may receive a PDCCH which is a downlink control channel and/or a PDSCH which is a data channel, from a macro node 510 which is an example of a transmission/reception base station. However, the UE 541 transmits all uplink related channels (PUSCH/PUCCH/SRS/PRACH) to a base station 526 that is adjacent to the UE 512 or has good channel quality. The cell ID of the macro base station 510 is #0 and uses a cell ID identical to those of other base stations 522, 524, 526, 532, 534, and 536. The base station 526 among the base stations is a base station having good geometry or channel quality for the UE 541.

Figure 6:
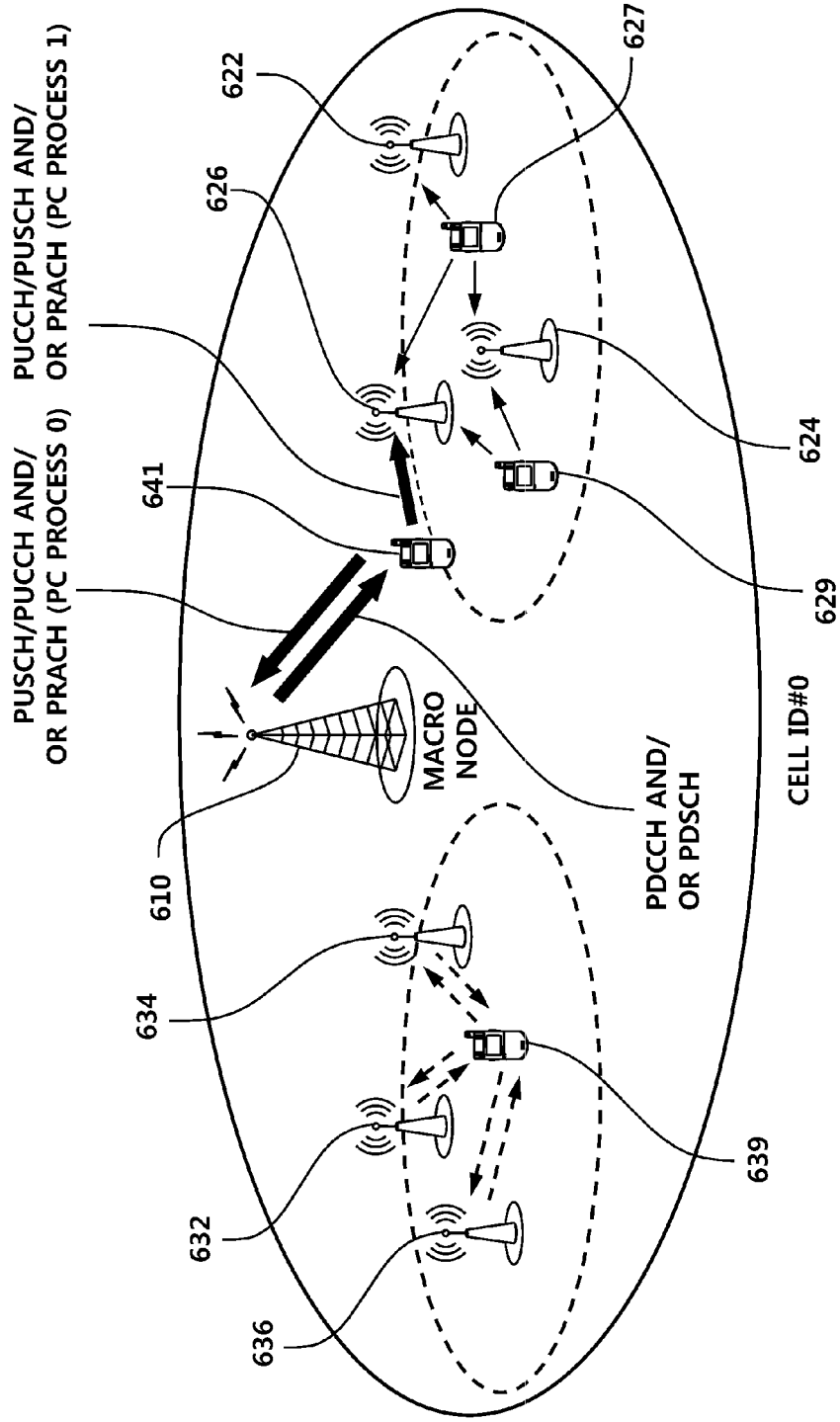
FIG. 6 is a diagram illustrating transmitting by a UE a random access preamble to a transmission/reception base station where the UE belongs and to a base station where the UE does not belong, based on an independent process, according to another embodiment of the present disclosure.

FIG. 6 is a diagram illustrating transmitting a random access preamble from a UE to a transmission/reception base station where the UE belongs and to a base station where the UE does not belong, based on an independent process, in accordance with another embodiment of the present disclosure.

Referring to FIG. 6, a UE receives a downlink control channel and a data channel from a cell/base station/RRH/antenna/RU/LPN/point where the UE belongs. A UE transmits a PUCCH and a PUSCH to a corresponding cell/base station/RRH/antenna/RU/LPN/point or another cell/base station/RRH/antenna/RU/LPN/point. The PUCCH transmits A/N with respect to a downlink transmission and the PUSCH is an uplink data channel from among uplink related channels. A UE transmits a random access preamble to a cell/base station/RRH/antenna/RU/LPN/point where the UE belongs and another cell/base station/RRH/antenna/RU/LPN/point where the UE does not belong, based on an independent Power Control (PC) process.

A UE 641 may receive a PDCCH which is a downlink control channel and/or a PDSCH which is a data channel, from a transmission/reception base station, for example, a macro node 610. In addition, in an uplink, the UE 641 transmits a PUCCH and a PUSCH to the macro node 610 or another base station 626. The UE 641 applies an independent process when transmitting a PRACH. For example, the UE transmits a PRACH having a PC process 0 to the corresponding transmission/reception base station 610, and transmits a PRACH having a PC process 1 to another base station 626. The cell ID of the macro base station 610 is #0 and uses a cell ID identical to those of other base stations 622, 624, 626, 632, 634, and 636.

Hereinafter, a technical field of the present disclosure and the need of the present disclosure will be described. Typically, a communication base station includes a digital signal processor and a radio signal processor in a single physical system. However, the system needs to install a base station including all the processors, in a cell, and, thus, there may be limits in optimizing cell design. To overcome the above drawback, a cell is formed by connecting a plurality of antennas to a single base station according to a desired scheme, and thus, a coverage hole may be decreased. However, the scheme allows effective cell design but it is difficult to maximize system capacity. Therefore, there is a desire for a new base station structure and a transmission method to optimize wireless capacity. A Cloud Communication Center (CCC) that is proposed is radio network technology that separates a digital signal processor (a Digital Unit (DU)) of a base station and a radio signal processor (Radio Unit (RU)) that transmits/receives a wireless signal, and intensively disposes DU(s) in a telephone station and disposes RU(s) in a service area, unlike a typical base station system.

In the environment, a UE is located within a coverage area of multiple RUs or moves through a coverage area of multiple RUs, and may be provided with a service from an RU at a cell edge of the multiple RUs. That is, while the UE stands still or moves, a coverage area of a downlink transmission signal transmitted from an RU may be different from a coverage area of an uplink that the UE is to transmit to an RU. That is, the geometry of a UE for a downlink and the geometry for an uplink may be different. Also, the UE may perform uplink transmission to an RU that is different from a current serving RU, from which the UE receives a data channel and a control channel through a downlink.

Similarly, in a heterogeneous network including macro cell deployment and various small cell deployments, a coverage area of a macro cell and a coverage area of a small cell are different, a UE receives downlink data and control channels from the macro cell, and a UE transmits an uplink data and control to a small cell coverage area having better geometry in an uplink. Thus, for the corresponding downlink, a downlink data transmission rate may be improved by increasing reliability for uplink control information. Furthermore, for the uplink, an uplink transmission rate may be improved by increasing reliability for control information and reliability for uplink data transmission.

Therefore, in accordance with at least one embodiment, a method may be provided for base station coordination when transmission/reception targets of an uplink and a downlink from a UE are identical (e.g., similar to a typical system: a UE transmits/receives uplink/downlink data and control channels to/from a single base station or an RU) and when transmission/reception targets from a UE are different (e.g., unlike the typical system: operations are executed under coordination of a base station so that targets for data and control channels of an uplink and a downlink are different from one another).

Hereinafter, a typical method for controlling transmission power of a random access channel will be described. According to the typical technology, when transmission/reception targets of an uplink and a downlink from a UE are identical, a UE transmits a random access channel, a sounding reference signal, an uplink data channel, and an uplink control channel to a base station through an identical uplink. Thus, a transmission power of an uplink random access channel may be determined based on an open loop power control mechanism, according to the following equation for calculating P_PRACH.

That is, it is determined based on PREAMBLE_RECEIVED_TARGET_POWER indicated by a base station, a path loss estimation value associated with a primary cell, estimated by a UE, and a maximum transmission power $P_{CMAX,c}(j)$ for a serving cell c.

A preamble transmission power $P_{PRACH}$ may be defined by the following Equation 1.

$$P_{PRACH} = \min\{P_{CMAX,c}(i), \text{PREMABLE\_RECEIVED\_TARGET\_POWER} + PL_c\}\_[dBm] \quad \text{[Equation 1]}$$

$P_{CMAX,c}(i)$ is set to UE transmission power, defines for subframe i of serving cell c $PL_c$ is downlink path loss estimation value, calculated with respect to serving cell c Here, a downlink path loss estimation associated with a primary cell, executed in a UE, may be executed based on a measurement of a cell-specific reference signal in the primary cell.

In addition, the random access mechanism uses power ramping. That is, a method of increasing a corresponding step size of a PRACH transmission power for a subsequent PRACH transmission based on configuration information indicated by a base station may be used for each failed random access. This may be considered as a method to make a subsequent random access successful.

In a case of CoMP scenario 3 and a heterogeneous network or in a case of the deployment of CoMP scenario and the deployment of multiple cells/base stations/RRHs/antennas/RUs/points, a UE that receives a downlink reference signal from multiple points may incorrectly measure a downlink reference signal while executing path loss estimation. The UE sets transmission power of a random access preamble based on the path loss estimation value. Thus, power setting which is inappropriate for reception from a corresponding cell/base station/RRH/antenna/RU/point may be executed while the transmission power of the corresponding random access preamble is set. That is, when the transmission power of the random access preamble is set to be lower than a level appropriate for receiving the random access preamble, detection of the random access preamble fails. Thus, there may be additional re-attempts at a random access process. Also, when the transmission power of the random access preamble is set to be higher than a level appropriate for reception, the reception and detection of the random access preamble may be successful but there may be interference to a cell/base station/RRH/antenna/RU/point that is different from a target cell/base station/RRH/antenna/RU/point of the corresponding random access preamble. As described above, when a random access preamble power is inappropriately set, the number of retransmissions of a random access preamble may increase, and interference may occur among cells/base stations/RRHs/antennas/RUs/points, due to the power ramping.

In order to enable transmission to a cell/base station/RRH/antenna/RU/point having good geometry associated with an uplink when an uplink coverage and a downlink coverage are different, a method of setting a transmission power of a random access preamble needs to be considered, for transmitting a random access preamble to a cell/base station/RRH/antenna/RU/point different from a corresponding cell/base station/RRH/antenna/RU/point so as to transmit uplink data and control channels for the purpose of coordinating uplink synchronization and Timing Advance (TA) or requesting scheduling in an uplink.

That is, when each channel transmits an uplink transmission to a different link, as opposed to an identical link and identical cell/base station/RRH/antenna/RU/point, that is, a cell/base station/RRH/antenna/RU/point that is distinguished from a corresponding cell/base station/RRH/antenna/RU/point, an uplink power control is inappropriate for a target uplink transmission link and is not effectively executed. Thus, a transmission power level of each uplink channel may increase or decrease and therefore interference to the uplink may decrease throughput of the uplink and the downlink.

In accordance with an embodiment of the present disclosure, a method may be provided for setting transmission power of an uplink random access preamble, in order to enable a UE (e.g., UE that belongs to a cell/base station/RRH/antenna/RU/point, that is, a UE that executes downlink cell search through the corresponding cell/base station/RRH/antenna/RU/point and a UE that receives downlink control channel through the corresponding cell/base station/RRH/antenna/RU/point) to support a transmission to a cell/base station/RRH/antenna/RU/point that is different from the cell base station/RRH/antenna/RU/point having better channel quality and geometry, under a case of CoMP scenario 3 and a heterogeneous network or a case of deployment of CoMP scenario 4 and deployment of multiple cells/base stations/RRHs/antennas/RUs/points.

In accordance with another embodiment of the present disclosure, a method may be provided for setting transmission power of an uplink random access preamble, in order to enable a UE (e.g., UE that belongs to a cell/base station/RRH/antenna/RU/point (first base station), that is, a UE that executes downlink cell search through the corresponding cell/base station/RRH/antenna/RU/point (first base station) and a UE that receives downlink control channel,) to support transmission to a cell/base station/RRH/antenna/RU/point (second base station) that is different from the cell base station/RRH/antenna/RU/point (first base station) having better channel quality and geometry, under a case of CoMP scenario 3 and a heterogeneous network or a case of deployment of CoMP scenario 4 and deployment of multiple cells/base stations/RRHs/antennas/RUs/points. That is, embodiments of the present disclosure relate to a method and apparatus for power control of a random access channel under the case of CoMP scenario 3 and a heterogeneous network or the case of the deployment of CoMP scenario 4 and the deployment of multiple cells/base stations/RRHs/antennas/RUs/points.

The detailed method of setting a power control includes: i) a method of setting transmission power of an uplink random access preamble, ii) a method of explicitly indicating information associated with a transmission, and iii) a method of implicitly indicating information associated with a transmission. Each method will be described as follows. Hereinafter, a transmission/reception base station that transmits a downlink is referred to as a first base station and a base station that is distinguished from the first base station is referred to as a second base station.

Power Setting Method: A Method of Setting Transmission Power of an Uplink Random Access Preamble The power setting method of the present disclosure is a method of setting transmission power of an uplink random access preamble so as to support transmission to a cell/base station/RRH/antenna/RU/point that is different from a downlink transmission cell/base station/RRH/antenna/RU/point having better channel quality and geometry associated with an uplink, or a method of setting transmission power of an uplink random access preamble when the corresponding transmission is supported. The detailed embodiments of the present disclosure may be classified into a case A, a case B, and a case C.

Case A) A method of extending an available range for control of a random access transmission power, among parameters used for a random access transmission power.

A-1) it is possible to increase an available value range of preambleInitialReceivedTargetPower. That is, it may extend the value range of preambleInitialReceivedTargetPower, which a base station may designate with respect to a random access preamble. For example, when the length of preambleInitialReceivedTargetPower is 4 bits, a method may be consider to increase a probability of successful detection of an initial random access preamble based on an error of path loss estimation, by extending the range based on the number of additional bits. The following Table 1 is an example of extending the value range of preambleInitialReceivedTargetPower by 2 bits, which is merely an example and various types of extensions may be available. In other words, the value range of preambleInitialReceivedTargetPower may be embodied to be different from the example of Table 1, based on a system.

TABLE 1

Extension of value range of
preambleInitialReceivedTargetPower powerRampingParameters                SEQUENCE {
  powerRampingStep                      ENUMERATED {dB0, dB2,
                                          dB4, dB6},
  preambleInitialReceivedTargetPower    ENUMERATED {
    dBm-120, dBm-118, dBm-116, dBm-114, dBm-112,
    dBm-110, dBm-108, dBm-106, dBm-104, dBm-102,
    dBm-100, dBm-98, dBm-96, dBm-94, dBm-92,
    dBm-90, dBm-88, dBM-86, dBm-122, dBm-124}
}

That is, through bit mapping up to a predetermined bit, an indication range of preambleInitialReceivedTargetPower for designating a random access preamble transmission power is operated in the same manner as the existing legacy operation method for backward compatibility, and the indication for an additional range of preambleInitialReceivedTargetPower for determining a random access preamble transmission power may be indicated through an added bit indication. Therefore, a base station enables a UE to indicate the value of preambleInitialReceivedTargetPower to be appropriate for an intended operation, within the extended range, based on a location, channel state information of the UE, or the like, and thus, a transmission power of a random access preamble may be effectively set.

For example, when the value indicating preambleInitialReceivedTargetPower is 6 bits as shown in Table 1, the value set in the first 4 bits is used according to 16 legacy operation methods. When the value set in the last 2 bits is set, the UE may increase the probability of successful detection of an initial random access preamble by an error of path loss estimation.

A-2) it is possible to increase the available value range of powerRampingStep. That is, it is a method of increasing a size of powerRampingStep in addition to the range of a corresponding parameter used in the typical technology, so as to decrease the number of retransmissions of a random access preamble. Similar to A-1), it sets retransmission power of a random access preamble according to the existing legacy operation method through bit mapping up to a predetermined bit, for the backward compatibility, in the same manner as the typical technology, and a base station enables each UE to indicate a value of powerRampingStep having an extended range to be appropriate for an intended UE operation. Thus, a random access preamble transmission power may be effectively executed. This may be configured as shown in the following Table 2. The following Table 2 is an example of extending the range of powerRampingStep. The corresponding case is merely an example, and various types of extensions may be available. In other words, the value range of powerRampingStep may be embodied to be different from the example of Table 2, based on a system.

TABLE 2

Extension of value range of powerRampingStep powerRampingParameters                SEQUENCE {
  powerRampingStep                      ENUMERATED {dB0, dB2,
                                          dB4, dB6, dB8, dB10},
  preambleInitialReceivedTargetPower    ENUMERATED {
    dBm-120, dBm-118, dBm-116, dBm-114, dBm-112,
    dBm-110, dBm-108, dBm-106, dBm-104, dBm-102,
    dBm-100, dBm-98, dBm-96,
    dBm-94, dBm-92, dBm-90}
}

When applied, increase in inter-cell interference caused by decrease of the number of retransmissions of a random access preamble and an increase of a random access preamble power by power ramping in retransmission may be prevented.

A-3) A scheme of simultaneously supporting A-1) and A-2). That is, by simultaneously executing a method of extending an available value range of preambleInitialReceivedTargetPower indicated by a base station and a method of increasing an available value range of powerRampingStep to determine a transmission power of a random access preamble, the gain of system capacity in association with both A-1) and A-2) may be obtained. This is shown in the Table 3. The following Table 3 is an example of extending the value range of preambleInitialReceivedTargetPower and the value range of powerRampingStep, which is merely an example and various types of extension may be available. In other words, the value range of preambleInitialReceivedTargetPower and the value range of powerRampingStep may be embodied to be different from the example of Table 3, based on a system.

TABLE 3

Extension of value range of
preambleInitialReceivedTargetPower and powerRampingStep powerRampingParameters                SEQUENCE {
  powerRampingStep                      ENUMERATED {dB0, dB2,
                                          dB4, dB6, dB8, dB10},
  preambleInitialReceivedTargetPower    ENUMERATED {
    dBm-120, dBm-118, dBm-116, dBm-114, dBm-112,
    dBm-110, dBm-108, dBm-106, dBm-104, dBm-102,
    dBm-100, dBm-98, dBm-96, dBm-94, dBm-92,
    dBm-90, dBm-88, dBm-86, dBm-122, dBm-124}
}

Information of Table 1, 2, and 3 may be included in an RACH-ConfigCommon information element.

To add a random access parameter value as shown in the information of Table 1, 2, and 3, a method of using two times the information by adding minimum information, for example, only 1 bit, may be considered. For example, without considering bit mapping, preambleInitialReceivedTargetPower may be configured to indicate 32 pieces of information using 5 bits. In the same manner, powerRampingStep may be configured to indicate 8 pieces of information using 3 bits. Alternatively, the method may be embodied to differently apply preambleInitialReceivedTargetPower and powerRampingStep, based on explicit or implicit indication of information associated with transmission.

Figure 7:
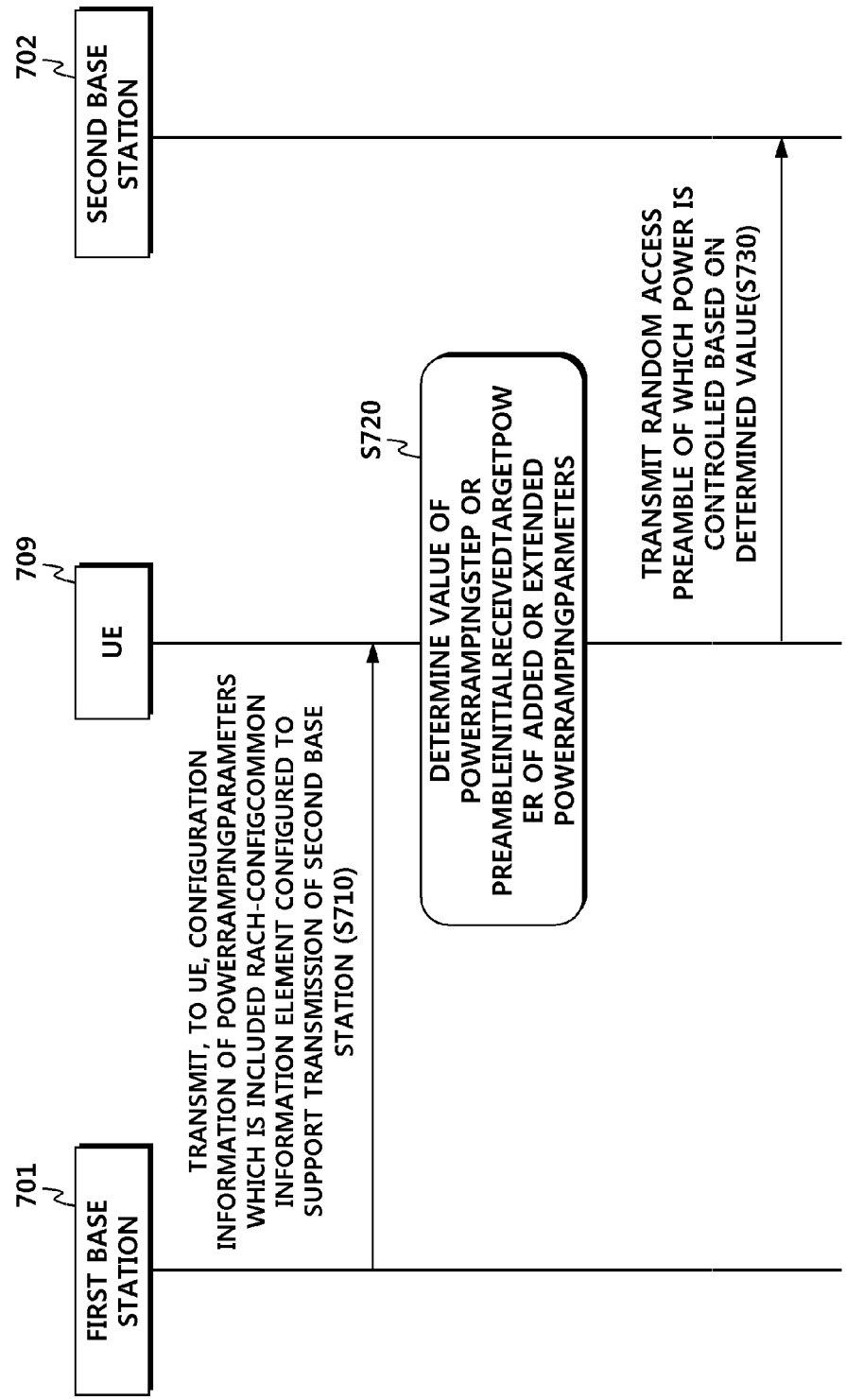
FIG. 7 illustrates power control of a random access preamble by extending an available range to control a random access transmission power, among parameters used for the random access transmission power, according to an embodiment of the present disclosure.

FIG. 7 illustrates power control of a random access preamble by extending an available range for controlling a random access transmission power, among parameters used for the random access transmission power, according to an embodiment of the present disclosure.

A first base station 701 includes configuration information of powerRampingParameters in an RACH-ConfigCommon information element configured to support transmission of a second base station. The first base station 701 transmits the same to the UE 709 in operation S710. The UE determines a value of powerRampingStep or preambleInitialReceivedTargetPower of added or extended powerRampingParmeters, as shown in Tables 1 to 3, in operation S720. Based on the determined value, the UE transmits a random access preamble with power controlled based on the determined value, in operation S730. The second base station 702 receives the random access preamble.

Case B) A method of additionally using a setting method associated with a path-loss estimation term.

B-1) Path loss may be estimated using a Channel State Information Reference Signal (CSI-RS) used in a downlink.

This is a method of estimating a corresponding path loss as a power control parameter for an uplink channel and signal transmission, using a Non-zero power CSI-RS resource and a zero power CSI-RS resource, which are determined to be UE-specific. That is, this is a method of executing a setting so as to use a corresponding path loss estimation value to be appropriate for a target reception cell/base station/RRH/antenna/RU/LPN/point when a transmission power of a channel and signal that a UE transmits in an uplink is controlled using the Non-zero power CSI-RS resource for path loss estimation with respect to a downlink through which a PDCCH or a PDSCH of a corresponding UE is received, and considering the zero power CSI-RS resource as path loss estimation in a predetermined CoMP measurement set, as opposed to the path loss estimation of a downlink through which a PDCCH or a PDSCH is received. That is, in the corresponding case, a non-zero power CSI-RS from another cell that is different from a serving cell may occupy the zero power CSI-RS resource indicated by a serving cell. Thus, it may be used for path loss estimation of a UE with the cell that is different from the serving cell. In this instance, for estimation of a CSI-RS transmitted from the different cell, a setting may be executed to exchange information associated with a CSI-RS transmitted to a UE through X2 interface between a first base station and a second base station, for example, cell ID information and CoMP set or CoMP measurement set information, or the like. In this instance, path loss estimation is more accurately executed through a CSI-RS. Alternatively, information for detecting a corresponding CSI-RS is exchanged within a CoMP set. Thus, more accurate path loss estimation through the corresponding CSI-RS may be available.

A method of estimating path loss using interference measurement resource (IMRs) among UE-specifically transmitted CSI-RS resources may be considered. This is a method of executing a setting so as to use a corresponding path loss estimation value to be appropriate for a target reception cell/base station/RRH/antenna/RU/LPN/point when a transmission power of a channel and a signal that a UE transmits in an uplink, is controlled, by considering the path loss estimation as path loss estimation in a predetermined CoMP measurement set, as opposed to path loss estimation of a downlink through which a PDCCH or a PDSCH is received.

That is, to summarize the method of estimating path loss using a CSI-RS, a Non-zero power CSI-RS determined to be UE-specific is used for path loss estimation with respect to a downlink transmitted from the first base station, and a zero power CSI-RS determined to be UE-specific is used for path loss estimation in a CoMP measurement set, for example, the second base station. In addition, an IMR may be used to execute the path loss estimation of the CoMP measurement set.

Figure 8:
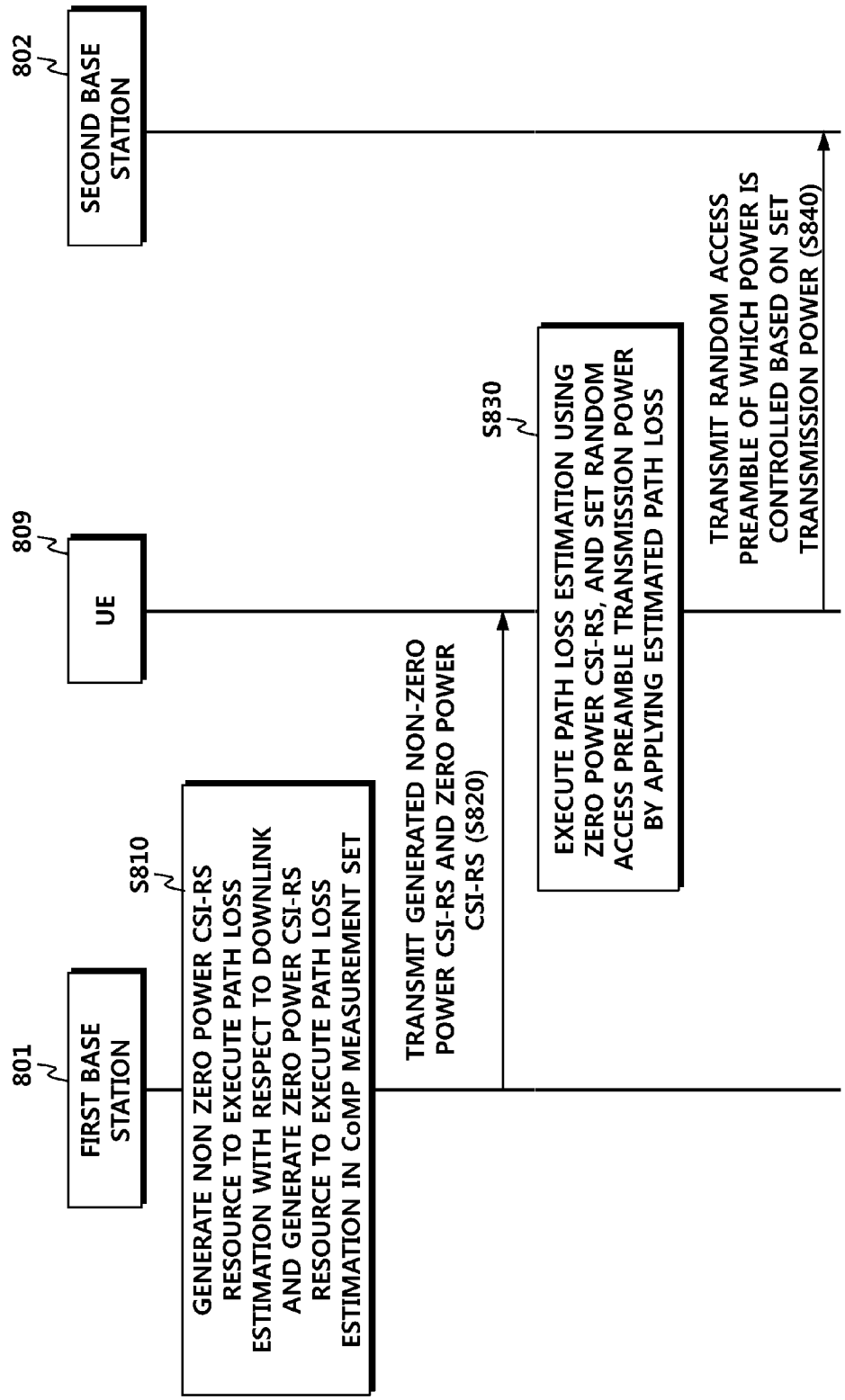
FIG. 8 illustrates power control of a random access preamble by additionally using a setting on a path loss estimation term, according to an embodiment of the present disclosure.

FIG. 8 illustrates executing power control of a random access preamble by additionally using a setting on path loss estimation term, according to an embodiment of the present disclosure. It is a drawing of an embodiment of the above described B-1). A first base station 801 configures a non-zero power CSI-RS resource to execute path loss estimation with respect to a downlink transmitted from a first base station. In addition, the first base station 801 configures a zero power CSI-RS resource determined to be UE-specific, to execute path loss estimation in a CoMP measurement set in operation S810. A downlink in which the non-zero power CSI-RS and the zero-power CSI-RS are configured is transmitted in operation S820. A UE 809 estimates path loss using the zero-power CSI-RS and applies the estimated path loss to set a random access preamble transmission power (power) in operation S830. The UE transmits a random access preamble with power controlled based on the set transmission power in operation S840. Here, operations S810 to S803 may further use an IMR for path loss estimation of a CoMP measurement set.

B-2) A method of estimating path loss using both a Cell-specific RS (CRS) and a CSI-RS, used in a downlink.

i) it is a method for enabling a UE for performing setting so as to use a corresponding path loss estimation value to be appropriate for a target reception cell/base station/RRH/antenna/RU/LPN/point when a transmission power of a channel and a signal that a UE transmits in uplink is controlled by executing path loss estimation with respect to a downlink through which a PDCCH or a PDSCH is received using a CRS determined to be base station-specific (cell specific), and considering a zero power CSI-RS resource or a non-zero power CSI-RS resource determined to be UE-specific as a path loss estimation value of a target reception cell/base station/RRH/antenna/RU/LPN/point in another link, as opposed to the path loss estimation with respect to the downlink through which a PDCCH or a PDSCH is received. Here, the CSI-RS resource used as the path loss estimation value with respect to another link may be the zero power CSI-RS resource or the non-zero power CSI-RS resource.

ii) it is a method for enabling a UE to execute a setting so as to use a corresponding path loss estimation value to be appropriate for a target reception cell/base station/RRH/ antenna/RU/LPN/point when a transmission power of a channel and a signal that a UE transmits in uplink is controlled by executing path loss estimation with respect to a downlink through which a PDCCH or a PDSCH is received using a CRS determined to be base station-specific, and using a non-zero power CSI-RS resource for correcting the path loss estimation through the CRS, and using a zero power CSI-RS resource for path loss estimation in a predetermined CoMP measurement set, as opposed to for path loss estimation with respect to the downlink through which a PDCCH or a PDSCH is received.

iii) it is a method for enabling a corresponding UE to execute path loss estimation with respect to a downlink through which a PDCCH or a PDSCH is received, using a CRS determined to be base station-specific, a non-zero power CSI-RS resource is used for correcting the path loss estimation through the CRS, and path loss estimation is executed using an IMR among UE-specifically transmitted CSI-RS resources. This is a method of executing a setting so as to use a corresponding path loss estimation value to be appropriate for a target reception cell/base station/RRH/antenna/RU/LPN/point when a transmission power of a channel and a signal that a UE transmits in an uplink is controlled by considering the path loss estimation as path loss estimation in a predetermined CoMP measurement set, as opposed to the path loss estimation with respect to the downlink through which a PDCCH or a PDSCH is received.

The method of estimating path loss using both the CRS and the CSI-RS which are used in a downlink, as shown in i), ii) and iii), may be a method of configuring an uplink/downlink to not provide a separate impact on a transmission power control of a legacy UE that executes transmission to an identical cell/base station/RRH/antenna/RU/LPN/point, and defines a UE process for executing path loss estimation through an additional CSI-RS resource, only for a UE that is different from a legacy UE and is capable of accepting a new configuration.

That is, to summarize the method of estimating path loss using both the CRS and the CSI-RS, path loss estimation with respect to a downlink transmitted from a first base station is executed using a CRS determined to be base station-specific (cell specific). In the setting of i), the zero power or non-zero power CSI-RS resource is considered as a path loss estimation value associated with a second base station, which is a target reception cell/base station/RRH/antenna/RU/LPN/point. In the setting of ii), the non-zero power CSI-RS resource is used for correcting the CRS path loss estimation and the zero power CSI-RS resource is considered as a path loss estimation value associated with a second base station which is a target reception cell/base station/RRH/antenna/RU/LPN/point. In iii), the non-zero power CSI-RS resource is used for correcting the CRS path loss estimation, and the path loss estimation value associated with a second base station may be used by considering the path loss estimation using the IMR as path loss estimation in the CoMP measurement set.

Figure 9:
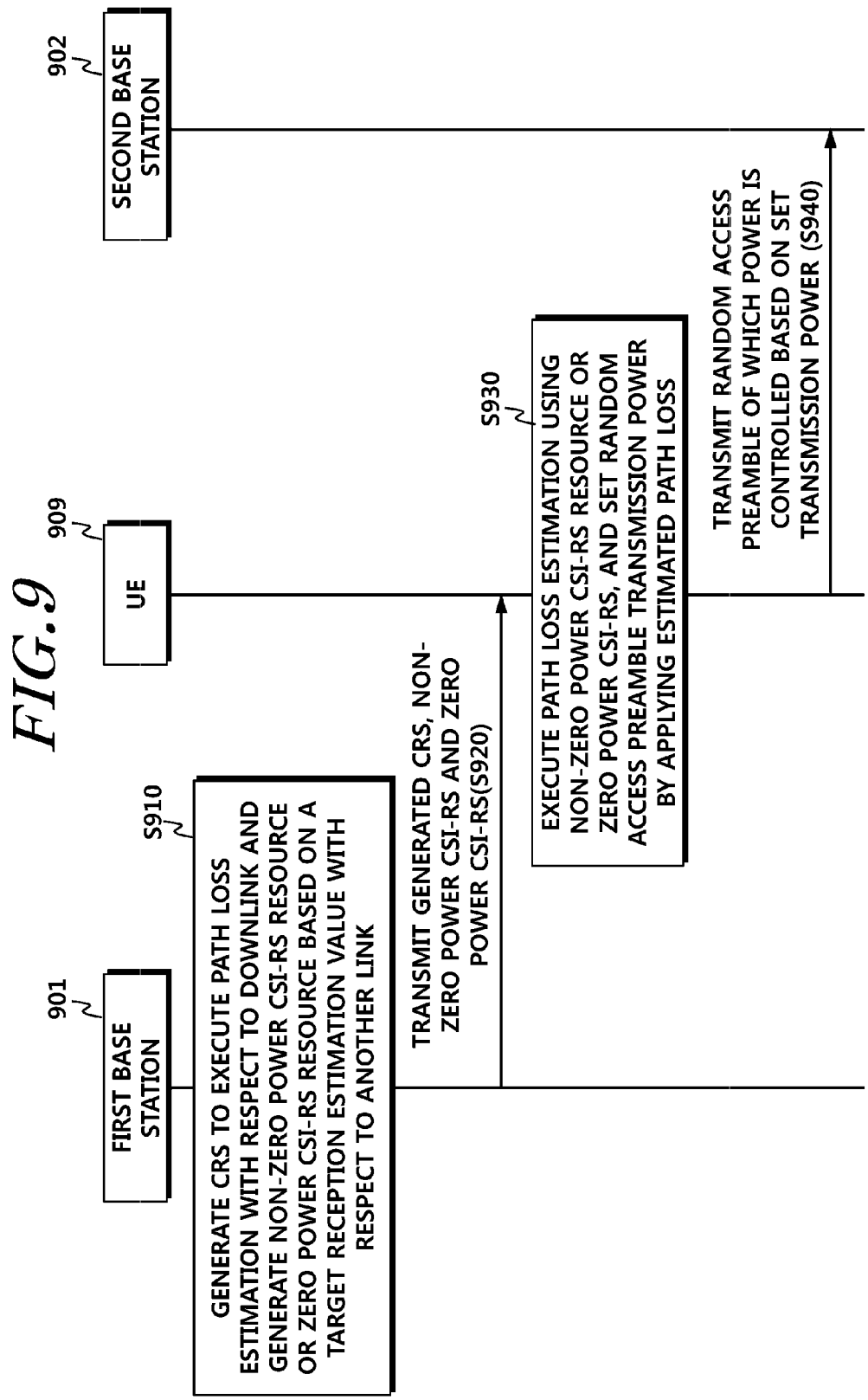
FIG. 9 illustrates power control of a random access preamble by additionally using a setting on a path loss estimation term, according to another embodiment of the present disclosure.

FIG. 9 illustrates power control of a random access preamble by additionally using a setting on a path loss estimation term, according to another embodiment of the present disclosure. It is a drawing of an embodiment of the above described B-2).

A first base station 901 generates a CRS so as to execute path loss estimation with respect to a downlink. In addition, the first base station 901 generates a non-zero power CSI-RS resource or a zero power CSI-RS based on a target reception estimation value with respect to another link in operation S910. The first base station 901 transmits the CRS, the non-zero power CSI-RS, and the zero power CSI-RS in a downlink in operation S920. A UE 909 estimates path loss using the zero-power CSI-RS, and applies the estimated path loss to set a random access preamble transmission power in operation S930. The UE transmits a random access preamble of which power is controlled based on the set transmission power in operation S940.

ii) of B-2) is also embodied in the same manner as FIG. 9. In this instance, operation S910 may be modified as follows. The first base station 901 generates a CRS so as to execute path loss estimation with respect to a downlink, and configure a non-zero power CSI-RS resource to correct the path loss estimation through the CRS. In addition, the first base station 901 generates a zero power CSI-RS based on a target reception estimation value associated with another link. In the same manner, operation S903 may be configured to enable the UE 909 to estimate path loss using the zero-power CSI-RS, and to set a random access preamble transmission power by applying the estimated path loss.

iii) of B-2) is also embodied in the same manner as FIG. 9. In this instance, operation S910 may be modified as follows. The first base station 901 generates a CRS so as to execute path loss estimation with respect to a downlink, and configure a non-zero power CSI-RS resource to correct the path loss estimation through the CRS. In addition, the first base station 901 configures a UE-specific CSI-RS to use an IMR based on a target reception estimation value with respect to another link. In the same manner, operation S930 is configured to enable the UE 909 to estimate path loss using the IMR, and to set a random access preamble transmission power by applying the estimated path loss.

Case C) A method of using a transmission power setting of an uplink random access preamble, which is independent from an existing method.

It is a method that sets preambleInitialReceivedTargetPower_1 and powerRampingStepsize_1, which are independent parameters for indicating the corresponding operation, sets a path loss estimation value obtained through the path loss estimation method of Case B of the present disclosure as an additional parameter PL_c^(1), as opposed to the existing path loss estimation through a downlink reference signal, and sets a transmission power of a corresponding random access preamble.

To summarize the power setting method, transmission power is indicated by increasing an available range for control of a random access transmission power among parameters used for a random access transmission power, a CSI-RS or an IMR is used for path loss estimation, or a separate parameter is set to set a transmission power of a random access preamble.

First Indication Method: A Method of Explicitly Indicating Information Associated with Transmission This is an explicit indication method that explicitly indicates a target cell that receives a random access preamble is identical to a cell from which a PDCCH and a PDSCH are received and to which a PUSCH is transmitted, like the conventional method, or the target cell is different from a cell from which a PDSCH is received and to which a PUSCH is transmitted, when a transmission power of a random access preamble is set.

When a corresponding UE transmits a random access preamble, a base station may enable the UE to semi-statically determine a random access preamble transmission power toward a target cell of the random access preamble. To this end, an additional RRC parameter 1 bit may be defined to indicate the corresponding operation in a Radio Resource Control (RRC) parameter as explicit signaling.

Alternatively, when a transmission power of a random access preamble transmitted by a UE is determined, a base station may enable the UE to dynamically determine the transmission power. To this end, an indication bit may be added to a PDCCH (EPDCCH) for the corresponding operation through additional signaling. When the UE sets a transmission power of a random access preamble to be transmitted by the UE, through the explicit signaling, the UE determines whether a) the UE sets a parameter to execute a legacy operation and sets a transmission power of a random access preamble based on a path loss estimation value associated with a serving cell/base station/RRH/antenna/RU/LPN/point, or b) to enable the UE to recognize a transmission as a transmission to another cell/base station/RRH/antenna/RU/LPN/point, as opposed to a transmission to a serving cell/base station/RRH/antenna/RU/LPN/point, and to transmit the random access preamble to the other cell/base station/RRH/antenna/RU/LPN/point, the UE sets a transmission power of a random access preamble based on extended parameters (that is, parameters set by preamble-InitialReceivedTargetPower and powerRampingStep) or independent RRC parameters (that is, preambleInitialReceivedTargetPower_1 and powerRampingStepsize_1 parameter), unlike the legacy operation, and sets a transmission power of a random access preamble using an estimation value obtained through additional path loss estimation provided in the present disclosure, as opposed to using the path loss estimation value associated with the serving cell/base station/RRH/antenna/RU/LPN/point.

Figure 10:
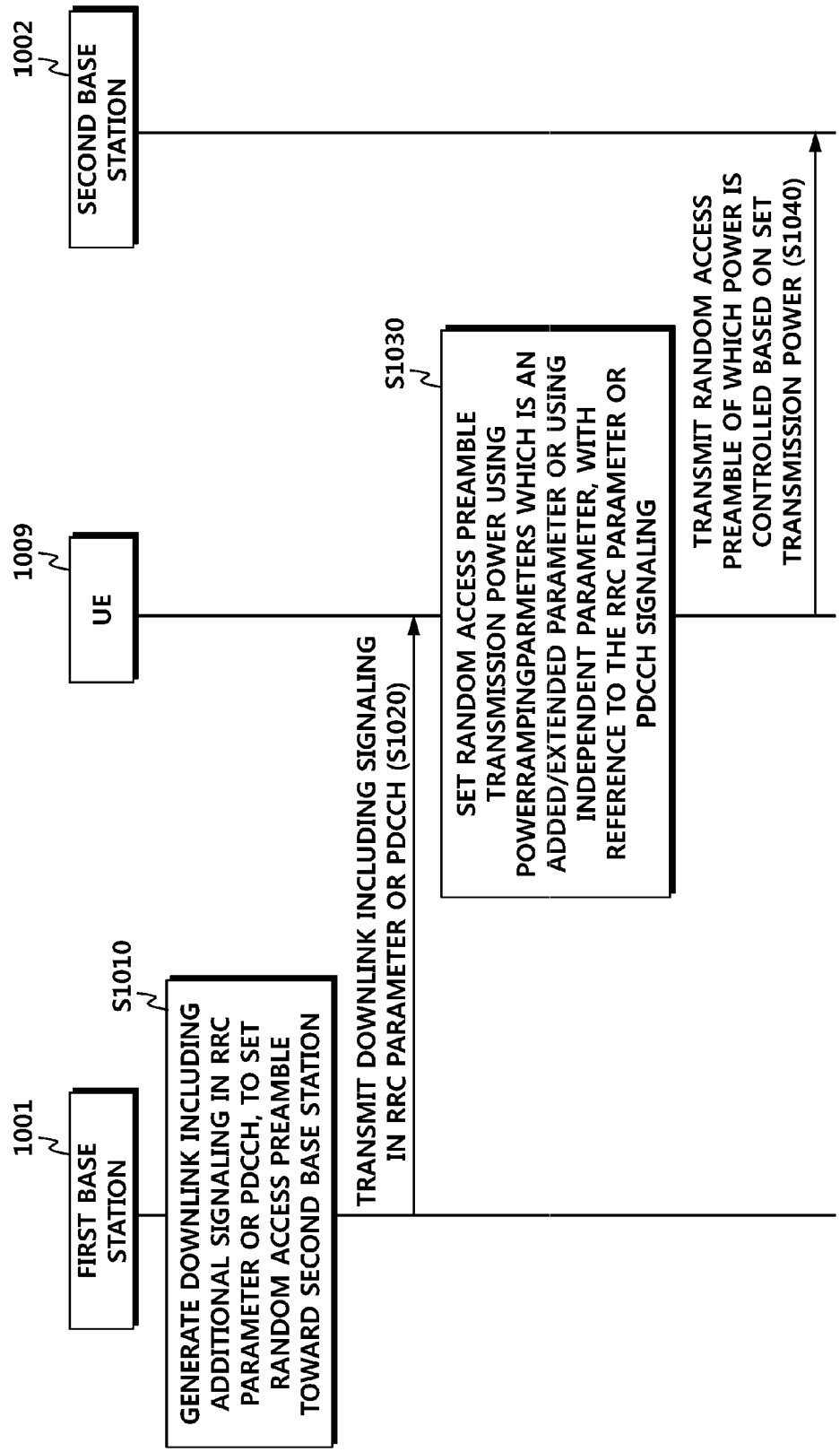
FIG. 10 illustrates explicitly indicating a transmission power for a UE when the transmission power is set, according to an embodiment of the present disclosure.

FIG. 10 illustrates explicitly indicating a transmission power to a UE when the transmission power is set, according to an embodiment of the present disclosure.

A first base station 1001 generates a downlink in which an additional signaling is included in an RRC parameter or a PDCCH (EPDCCH), so as to set a random access preamble toward a second base station, in operation S1010. The first base station 1001 transmits the generated signaling information through a downlink, in operation S1020. The additional signaling of the RRC parameter or PDCCH (EPDCCH) enables a UE 1009 to recognize that a transmission is a transmission to another cell/base station/RRH/antenna/RU/LPN/point that is the second base station 1002, as opposed to a transmission to a serving cell/base station/RRH/antenna/RU/LPN/point which is the first base station 1001, and instructs the UE 1009 to transmit a random access preamble to the second base station 1002. Therefore, the UE 1009 sets a random access preamble transmission power using powerRampingParmeters which is an added/extended parameter, for example, preambleInitialReceivedTargetPower and powerRampingStep, or using an independent parameter (preambleInitialReceivedTargetPower_1 and powerRampingStepsize_1 parameter), with reference to the RRC parameter or PDCCH(EPDCCH) signaling, in operation S1030. The transmission power of the random access preamble may be set using a path loss estimation value calculated through the additional path loss estimation method that has been described with reference to Case B or Case C. Subsequently, the UE 1009 transmits the random access preamble of which power is controlled, in operation S1040, and this is transmitted to the second base station 1002.

When there is no additional indication for an explicit signaling that a base station transmits to a UE, the UE recognizes a transmission as a transmission to a serving cell/base station/RRH/antenna/RU/LPN/point from which a PDCCH is received, and sets a random access preamble power based on the conventional method, for transmitting the random access preamble to the corresponding serving cell/base station/RRH/antenna/RU/LPN/point. This may be considered a method for setting UE behavior to be maintained, which is operated in an existing legacy UE with respect to a simultaneous transmission of a random access preamble or a PRACH and another uplink data channel (PUSCH), an uplink control channel (PUCCH), and an SRS, and the like.

Second Indication Method: A Method of Explicitly Indicating Information Associated with Transmission This is an implicit indication method that implicitly indicates a target cell that receives a random access preamble is identical to a cell from which a PDCCH and a PDSCH are received and to which a PUSCH is transmitted, or the target cell is different from a cell from which a PDSCH is received and to which a PUSCH is transmitted, without using an additional signal, when a transmission power of a random access preamble is set.

In explicit signaling, when independent N_id^RACH_Preamble for generating a sequence of a random access preamble is configured in an RRC parameter, without an overhead of an additional RRC parameter for indicating a random access preamble power control operation of a corresponding UE or an overhead incurred by an additional signaling in a PDCCH(EPDCCH) for identifying the corresponding operation, the UE recognizes that configuration information for setting a transmission power of a corresponding random access preamble corresponds to a transmission to another cell/base station/RRH/antenna/RU/LPN/point, as opposed to a transmission to the serving cell/base station/RRH/antenna/RU/LPN/point, and sets the transmission power of the random access preamble based on b) of the second controlling method, unlike the conventional technology (that is, a) of the second controlling method), so as to transmit the random access preamble to the other cell/base station/RRH/antenna/RU/LPN/point.

Here, independent N_id^RACH_Preamble for generating a sequence of a random access preamble may be configured by directly including N_id^RACH_Preamble in an RRC parameter, or by indicating a preamble index for generating a random access preamble sequence, as opposed to directly including N_id^RACH_Preamble in an RRC parameter. Here, the sequence used for random access preamble transmission may be configured based on a corresponding preamble sequence index or N_id^RACH_Preamble.

Otherwise, that is, when independent N_id^RS for generating a random access preamble sequence is not configured, the UE recognizes that the configuration information for setting transmission power corresponds to a transmission to a serving cell/base station/RRH/antenna/RU/LPN/point from which a PDCCH and a PDSCH are received, and to which a PUSCH is transmitted, and sets the transmission power for transmitting the random access preamble to the corresponding serving cell/base station/RRH/antenna/RU/LPN/point, based on a) of the second controlling method, which is the conventional method. This may be considered as a method for setting UE behavior to be maintained, which is operated in an existing legacy UE with respect to simultaneous transmission of a random access preamble or a PRACH and another uplink data channel (PUSCH), an uplink control channel (PUCCH), and an SRS, and the like.

Figure 11:
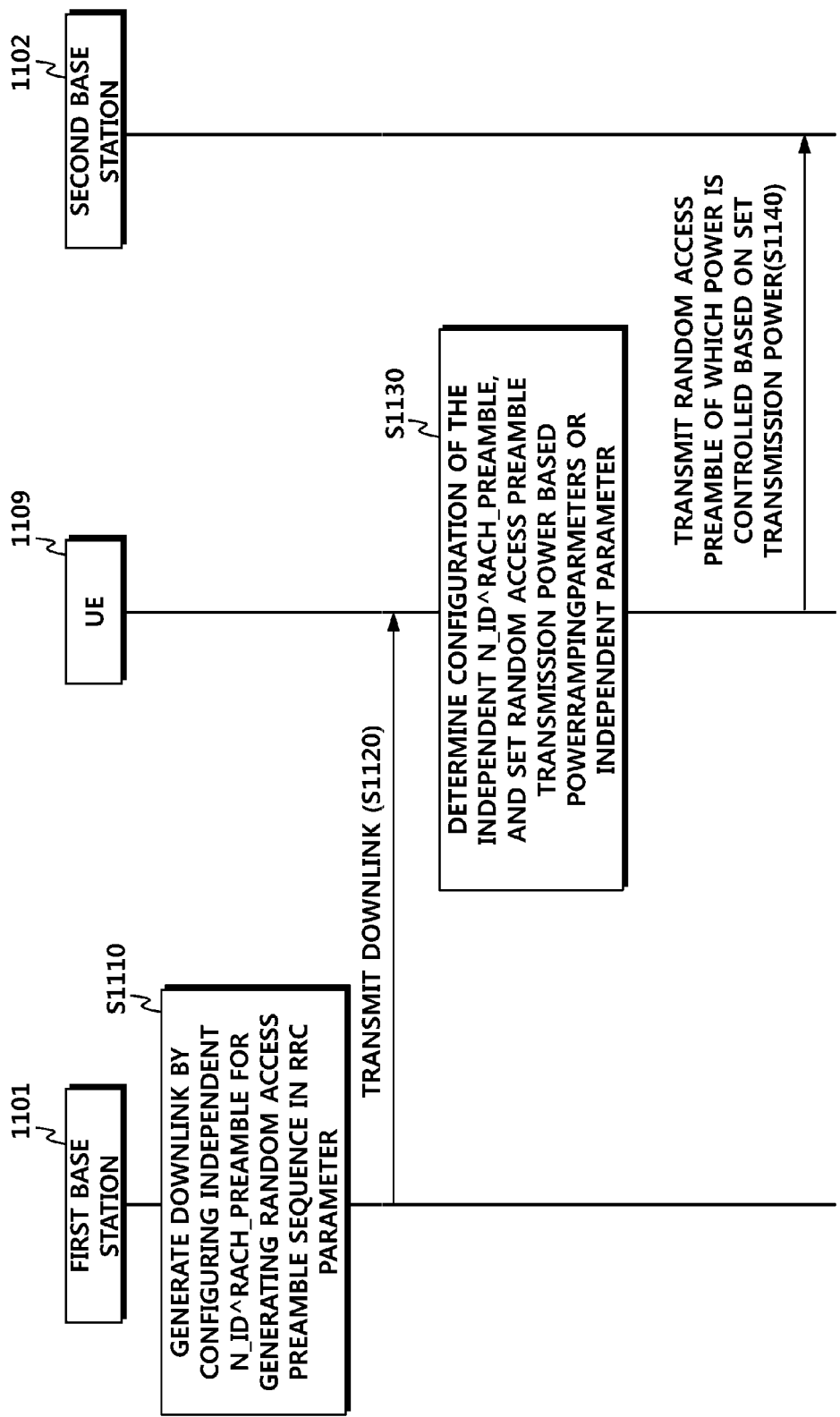
FIG. 11 illustrates implicitly indicating a transmission power for a UE when the transmission power is set, according to an embodiment of the present disclosure.

FIG. 11 illustrates a process that implicitly indicating a transmission power to a UE when the transmission power is set, according to an embodiment of the present disclosure.

A first base station 1101 generates a downlink by configuring independent N_id^RACH_Preamble for generating a random access preamble sequence in an RRC parameter, so as to set a random access preamble for a second base station 1102, in operation S1110. The first base station 1101 transmits the generated downlink in operation S1120. The independent N_id^RACH_Preamble may be configured, for example, by directly including N_id^RACH_Preamble in an RRC parameter or by indicating a preamble index for generating a preamble sequence.

A UE 1109 determines a configuration of the independent N_id^RACH_Preamble, and sets a random access preamble transmission power based on b) of the second controlling method in operation S1130. The transmission power of the random access preamble may be set using a path loss estimation value calculated through the additional path loss estimation method that has been described with reference to Case B or Case C. Subsequently, the UE 1109 transmits the random access preamble of which power is controlled in operation S1140, and this is transmitted to the second base station 1102.

The above described methods are methods for setting transmission power of a random access preamble. Thus, they are not be limited to a predetermined random access procedure, that is, a non-synchronized random access procedure and random access procedure by a PDCCH (EPDCCH) order, and may not be limited to a predetermined method among a contention-based random access and a contention free random access, and may be applied to all cases in which a UE transmits a random access preamble.

In accordance with an embodiment of the present disclosure, an apparatus may be provided for using a reception and transmission method of a UE that executes the operations described above.

The apparatus in accordance with an embodiment of present disclosure may support a UE that belongs to a cell/base station/RRH/antenna/RU/point, that is, a UE that receives a downlink control channel through the corresponding cell/base station/RRH/antenna/RU/point, to effectively execute transmission of a random access preamble or a PRACH to another cell/base station/RRH/antenna/RU/point that is different from the cell/base station/RRH/antenna/RU/point having better uplink channel quality and geometry, and to set a corresponding transmission power. Therefore, embodiments of the present disclosure overcome the coverage of a PRACH in an uplink and the coverage of a PUCCH and a PUSCH. In addition, when transmission to different cells/base stations/RRHs/antennas/RUs/points is executed, transmission power of an uplink random access preamble is controlled. Thus, interference among different cells/base stations/RRHs/antennas/RUs/points may be reduced. In addition, a battery of a UE may be reduced by retransmission of a PRACH and the PRACH coverage is overcome, and, thus, latency of access of UE to a base station may also be reduced.

Figure 12:
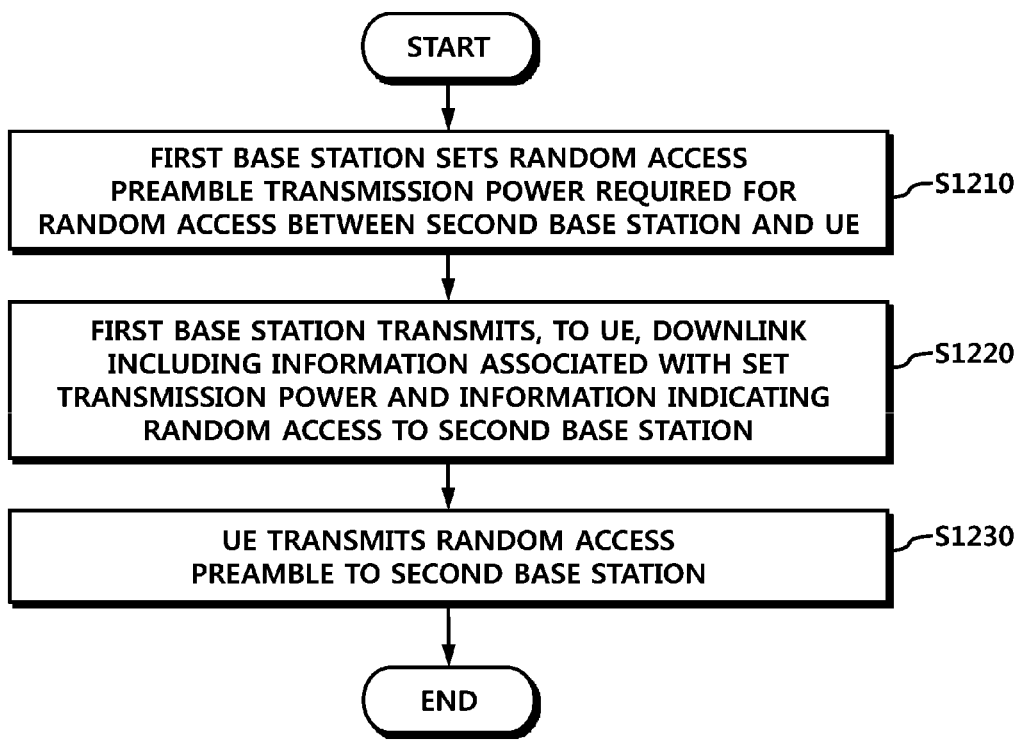
FIG. 12 is a flowchart illustrating random access power control in a first base station according to an embodiment of the present disclosure.

FIG. 12 is a flowchart illustrating random access power control in a first base station according to an embodiment of the present disclosure.

A first base station sets a random access preamble transmission power required for random access between a second base station and a UE in operation S1210. Subsequently, the first base station transmits, to the UE, a downlink including information associated with the set transmission power and information indicating random access to the second base station in operation S1220. Subsequently, the UE transmits a random access preamble to the second base station in operation S1230.

When Case A, B, and C for setting a random access preamble transmission power are applied, in a case of Case A/C and FIG. 7, operation S1210 includes a process of setting the random access preamble transmission power based on a second parameter which has a difference range from the first parameter used for a random access transmission power of the first base station or which is distinguished from the first parameter. This includes an embodiment of extending an available range for control of a random access transmission power among parameters used for random access transmission power, increasing the range, or applying a new parameter.

A downlink may be configured to enable one or more of a non-zero CSI-RS resource, a zero CSI-RS resource, and an Interference Measurement Resource (IMR) included in the downlink for path loss estimation with respect to the second base station, to be used for a path loss estimation value associated with the second base station. This has been described with reference to Case B, and FIGS. 8 and 9.

The indication information of operation S1220 may use the explicit indication method as shown in FIG. 10. In this instance, the indication information is included in an RRC parameter or a PDCCH (EPDCCH). When the indication information of operation S1220 is an implicit indication method, a downlink may include independent information for generating a sequence of a random access preamble toward the second base station, for example, N_id^RACH_Preamble, configured in an RRC.

Figure 13:
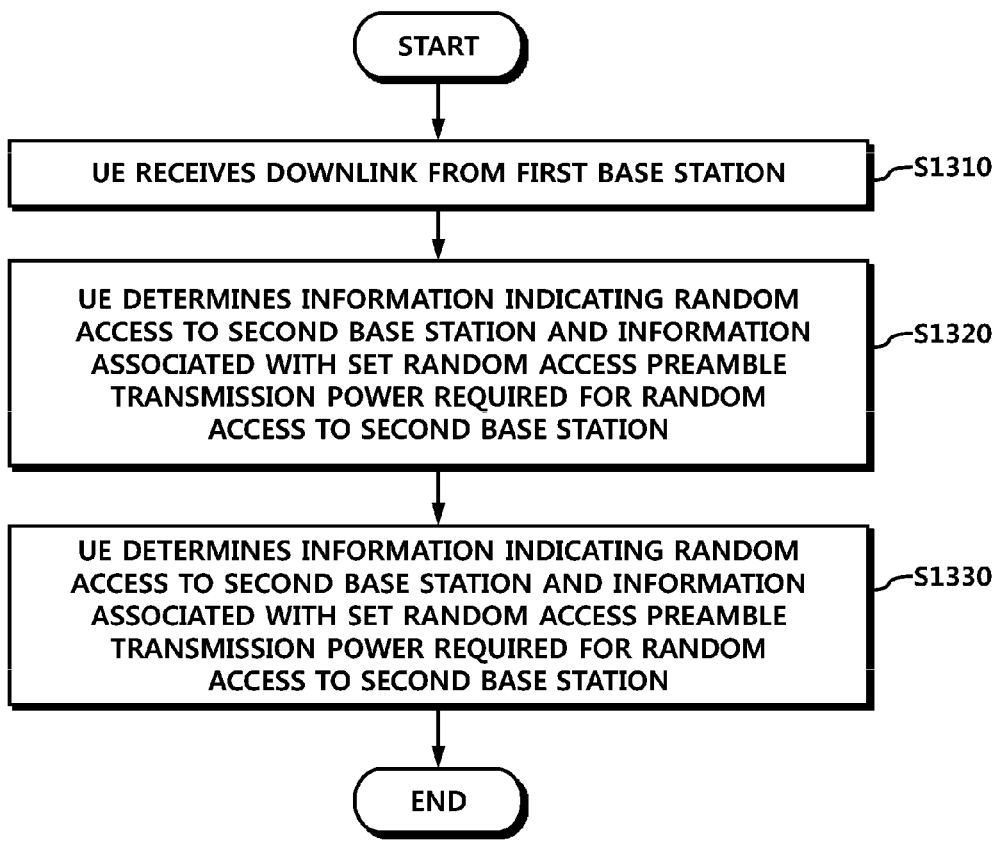
FIG. 13 is a flowchart illustrating random access power control in a UE according to an embodiment of the present disclosure.

FIG. 13 is a flowchart for random access power control in a UE according to an embodiment of the present disclosure.

A UE receives a downlink from a first base station, in operation S1310.

The UE determines information indicating random access to a second base station, and information associated with a set random access preamble transmission power required for random access to the second base station, from the received downlink, in operation S1320. Based on the determination, the UE determines that random access transmission to the second base station is indicated based on the indication information, and sets the random access preamble transmission power and transmits a random access preamble to the second base station, in operation S1330.

When Case A, B, and C for setting a random access preamble transmission power are applied, in a case of Case A/C and FIG. 7, operation S1330 uses a second parameter which has a difference range from a first parameter used for a random access transmission power of the first base station or which is distinguished from the first parameter to set the random access preamble transmission power in operation S1330. This includes an embodiment of extending an available range for a control of a random access transmission power among parameters used for random access transmission power, increasing the range, or applying a new parameter.

In operation S1330, the UE executes path loss estimation to set a transmission power. To execute estimation of path loss with respect to the second base station, the UE calculates a path loss estimation value associated with the second base station using one or more of a non-zero CSI-RS resource, a zero CSI-RS resource, and an Interference Measurement Resource (IMR) included in the downlink for path loss estimation with respect to the second base station, and uses the random access transmission power based on the calculated value. This has been described with reference to Case B, and FIGS. 8 and 9.

The indication information of operation S1320 may use the explicit indication method as shown in FIG. 10. In this instance, the indication information is included in an RRC parameter or a PDCCH (EPDCCH). When the indication information of operation S1320 is an implicit indication method, a downlink may include independent information for generating a sequence of a random access preamble toward the second base station, for example, N_id^RACH_Preamble, configured in an RRC, as shown in FIG. 11. The UE determines an explicit RRC parameter/PDCCH (EPDCCH) or implicit sequence generation information for a random access preamble, and transmits a random access preamble to the second base station. Through this process, a new transmission power may be set.

Figure 14:
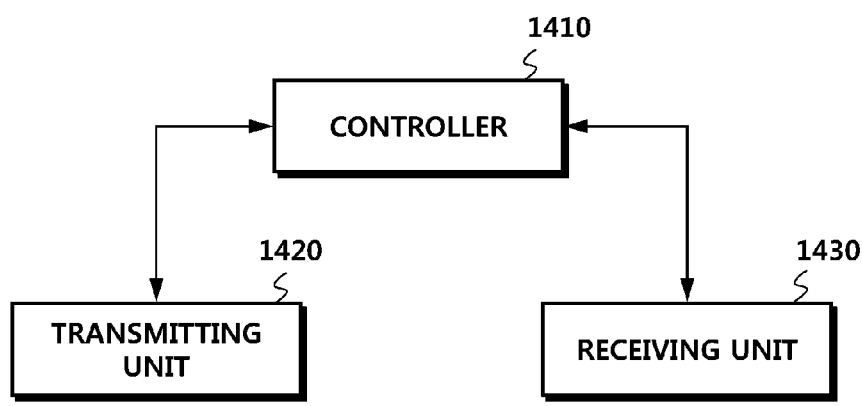
FIG. 14 is a diagram illustrating a base station according to another embodiment of the present disclosure.

FIG. 14 is a diagram illustrating a base station according to another embodiment of the present disclosure. For example, FIG. 14 illustrates the configuration of a first base station.

Referring to FIG. 14, a base station 1400 according to another embodiment may include a controller 1410, a transmitting unit (e.g., transmitter) 1420, and a receiving unit (e.g., receiver) 1430.

The controller 1410 may control a CoMP operation required for implementing the above described present disclosure, and general operations of a base station in association with power control of a random access preamble.

The transmitting unit 1420 and the receiving unit 1430 may be used for transmitting and receiving a signal or a message and data required for implementing the above described present disclosure, to/from a UE.

Particularly, the receiving unit 1430 receives a signal from a UE, and the controller 1420 sets a random access preamble transmission power required for random access between a second base station and the UE, and generates a downlink including information associated with the set transmission power and information indicating random access to the second base station. The transmitting unit 1420 transmits the downlink to the UE.

The controller may use case A, B, and C of FIGS. 7 to 12, and first and second indication methods, to set a random access preamble transmission power and to generate a downlink including information associated with the set transmission power and information indicating random access to the second base station.

Figure 15:
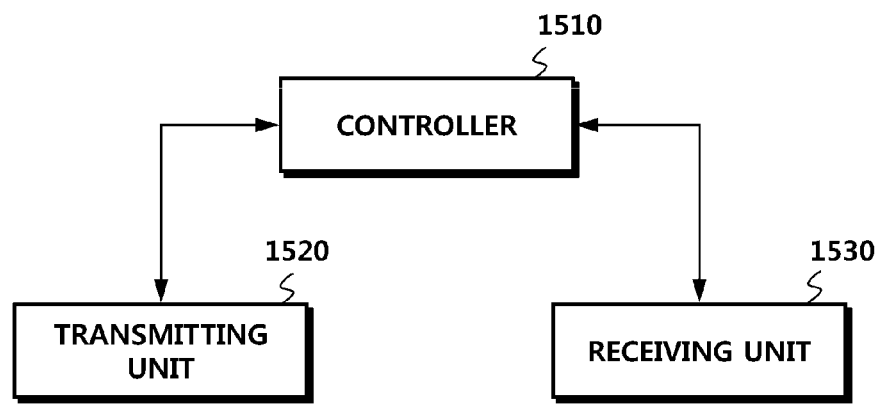
FIG. 15 is a diagram illustrating a UE according to another embodiment.

FIG. 15 is a diagram illustrating a UE according to another embodiment.

Referring to FIG. 15, a UE 1500 according to another embodiment may include a receiving unit (e.g., receiver) 1530, a controller 1510, and a transmitting unit (e.g., transmitter) 1520.

The receiving unit 1530 may receive, from a first base station, downlink control information, downlink data, a message, through a corresponding channel.

The controller 1510 may control a CoMP operation required for implementing the above described present disclosure, and general operations of a base station in association with a power control of a random access preamble.

The transmitting unit 1520 may transmit, to a base station, uplink control information, data, a message, through a corresponding channel.

Particularly, the receiving unit 1530 receives a signal from the first base station. The controller 1510 determines information indicating random access to the second base station and the random access preamble transmission power required for random access to the second base station, from the downlink received from the first base station, and sets the random access transmission power. The transmitting unit 1520 transmits a random access preamble to the second base station. The controller may use FIGS. 7 to 11, and FIG. 13, case A, B, and C, and first and second indication methods, to set the random access preamble transmission power and to determine the information associated with the set transmission power and the information indicating random access to the second base station, from the downlink.

Through the above described embodiments of the present disclosure, a UE (e.g., UE that belongs to a cell/base station/RRH/antenna/RU/point, that is, a UE that receives a downlink control channel through the corresponding cell/base station/RRH/antenna/RU/point) may be supported to effectively execute transmission of a random access preamble or a PRACH to another cell/base station/RRH/antenna/RU/point that is different from the cell/base station/RRH/antenna/RU/point having better uplink channel quality and geometry, and the UE is supported to set a corresponding transmission power.

Although a preferred embodiment of the present disclosure has been described for illustrative purposes, those skilled in the art will appreciate that various modifications, additions, and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A method for random access power control at a first base station in a coordinated multi-point transmission/reception (CoMP) system, the method comprising:
    setting, by the first base station, random access preamble transmission power required for random access between a second base station, different from the first base station, and a User Equipment (UE); and
    transmitting, by the first base station to the UE, a downlink signal including information associated with the set random access preamble transmission power and information indicating the random access to the second base station such that the UE transmits a random access preamble to the second base station based on the set random access preamble transmission power information included in the downlink signal,
    wherein at least one of a Non-zero Channel State Information Reference Signal (CSI-RS) resource, a zero CSI-RS resource, and an Interference Measurement Resource (IMR) included in the downlink signal transmitted by the first base station, is used for calculating a path loss estimation value associated with the second base station.

2. The method as claimed in claim 1, wherein the setting comprises:
    setting the random access preamble transmission power based on a second parameter that has a different range from a first parameter used for random access transmission power of the first base station or is distinguished from the first parameter.

3. The method as claimed in claim 1, wherein the indication information is included in one of a Radio Resource Control (RRC) parameter, a Physical Downlink Control CHannel (PDCCH), and an EPDCCH.

4. The method as claimed in claim 1, wherein the downlink signal includes, in an RRC parameter, independent information used for generating a sequence of the random access preamble to be transmitted to the second base station.

5. A method for random access power control at a User Equipment (UE) in a coordinated multi-point transmission/reception (CoMP) system, the method comprising:

receiving a downlink signal from a first base station;

obtaining, from the received downlink signal, information indicating random access to a second base station being different from the first base station and information associated with random access preamble transmission power preset by the first base station for the random access to the second base station;

setting random access transmission power for transmission of a random access preamble, based on the information obtained from the received downlink signal; and transmitting the random access preamble to the second base station, wherein the setting comprises:

calculating a path loss estimation value associated with the second base station, using at least one of a Non-zero Channel State Information Reference Signal (CSI-RS) resource, a zero CSI-RS resource, and an Interference Measurement Resource (IMR) included in the downlink signal transmitted by the first station; and setting the random access transmission power based on the calculated value.

6. The method as claimed in claim 5, wherein the information associated with the preset random access preamble transmission power is a second parameter that has a different range from a first parameter used for random access transmission power of the first base station or is distinguished from the first parameter.

7. The method as claimed in claim 5, wherein the indication information is included in a Radio Resource Control (RRC) parameter, a Physical Downlink Control CHannel (PDCCH), or an EPDCCH.

8. The method as claimed in claim 5, wherein the downlink signal includes, in an RRC parameter, independent information used for generating a sequence of the random access preamble to be transmitted to the second base station.

9. A base station corresponding to a first base station in a coordinated multi-point transmission/reception (CoMP) system, comprising:

a receiver configured to receive a signal from a User Equipment (UE);

a controller configured to set random access preamble transmission power required for random access between a second base station, different from the first base station, and the UE, and generate a downlink signal that includes information associated with the set random access preamble transmission power and information indicating random access to the second base station; and a transmitter configured to transmit the downlink signal to the UE such that the UE transmits a random access preamble to the second base station based on the set random access preamble transmission power information included in the downlink signal, wherein at least one of a Non-zero Channel State Information Reference Signal (CSI-RS) resource, a zero CSI-RS resource, and an Interference Measurement Resource (IMR) included in the downlink signal transmitted by the first station, is used for calculating a path loss estimation value associated with the second base station.

10. The base station as claimed in claim 9, wherein the controller is configured to set the random access preamble transmission power based on a second parameter that has a different range from a first parameter for random access transmission power of the first base station or is distinguished from the first parameter.

11. The base station as claimed in claim 9, wherein the indication information is included in a Radio Resource Control (RRC) parameter, a Physical Downlink Control CHannel (PDCCH), or an EPDCCH.

12. The base station as claimed in claim 9, wherein the downlink signal includes, in an RRC parameter, independent information used for generating a sequence of the random access preamble to be transmitted to the second base station.

* * * * *